(12) United States Patent
Roy et al.

(10) Patent No.: US 12,430,394 B2
(45) Date of Patent: Sep. 30, 2025

(54) FUTURE USE INTENTS FOR SAVED RESOURCES IN A BROWSER ENVIRONMENT

(71) Applicant: Google LLC, Mountain View, CA (US)

(72) Inventors: Manini Roy, Seattle, WA (US); Nasim Sedaghat, Montreal (CA); Aina Rubies Espinalt, San Francisco, CA (US); Filip Jerzy Gorski, Sammamish, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/366,503

(22) Filed: Aug. 7, 2023

(65) Prior Publication Data

US 2024/0045917 A1 Feb. 8, 2024

Related U.S. Application Data

(60) Provisional application No. 63/370,756, filed on Aug. 8, 2022.

(51) Int. Cl.
*G06F 16/955* (2019.01)
*G06F 3/0482* (2013.01)

(52) U.S. Cl.
CPC ........ *G06F 16/9562* (2019.01); *G06F 3/0482* (2013.01)

(58) Field of Classification Search
CPC ............................ G06F 16/9562; G06F 3/0482
See application file for complete search history.

(56) References Cited

U.S. PATENT DOCUMENTS

2007/0271498 A1  11/2007  Schachter
2007/0288426 A1  12/2007  Schachter
(Continued)

FOREIGN PATENT DOCUMENTS

WO   WO-2006067510 A2 *  6/2006  ............. G06Q 30/02

OTHER PUBLICATIONS

Fedewa Joe, What Is the Chrome "ReadingList," and How Do You Use It?, https://www.howtogeek.com/719357/what-is-the-chrome-reading-list-and-how-to-use-it/, Mar. 19, 2021 (Year: 2021).*

(Continued)

*Primary Examiner* — Nicholas Ulrich
(74) *Attorney, Agent, or Firm* — Brake Hughes Bellermann LLP

(57) ABSTRACT

Implementations may suggest and provide the ability to add future use intents for a saved resource. Future use intents can be used for organization and proactive actions for the resource. An example method includes determining a type of future use intent applies to a content item and providing an intent control for the content item configured to add a resource identifier of the content item to a saved resources datastore with a tag representing the type of future use intent. Another example method includes displaying a list of saved resources with a first selectable control and a second selectable control, filtering the list to saved resources associated with a first or second future use intent tag in response selection of the first or second selectable control respectively. This enables users to easily save and categorize content items for future reference or specific purposes based on their intended use.

22 Claims, 17 Drawing Sheets

(56) References Cited

U.S. PATENT DOCUMENTS

| | | | |
|---|---|---|---|
| 2011/0258216 A1 | 10/2011 | Supakkul et al. | |
| 2014/0365855 A1* | 12/2014 | Decker | G06F 16/957 |
| | | | 715/205 |
| 2017/0351778 A1* | 12/2017 | Sperling | G06F 16/38 |
| 2018/0108054 A1* | 4/2018 | Doubinski | G06Q 30/0222 |
| 2023/0031877 A1* | 2/2023 | Locker | G06F 16/9535 |

OTHER PUBLICATIONS

International Search Report and Written Opinion for PCT Application No. PCT/US2023/071785, mailed Oct. 5, 2023, 27 pages.
"Firefox/Feature Brainstorming: Bookmarks", MozillaWiki, http://web.archive.org/web/20220529121912/, https://wiki.mozilla.org/Firefox/Feature_Brainstorming:Bookmarks, May 29, 2022, 26 pages.

* cited by examiner

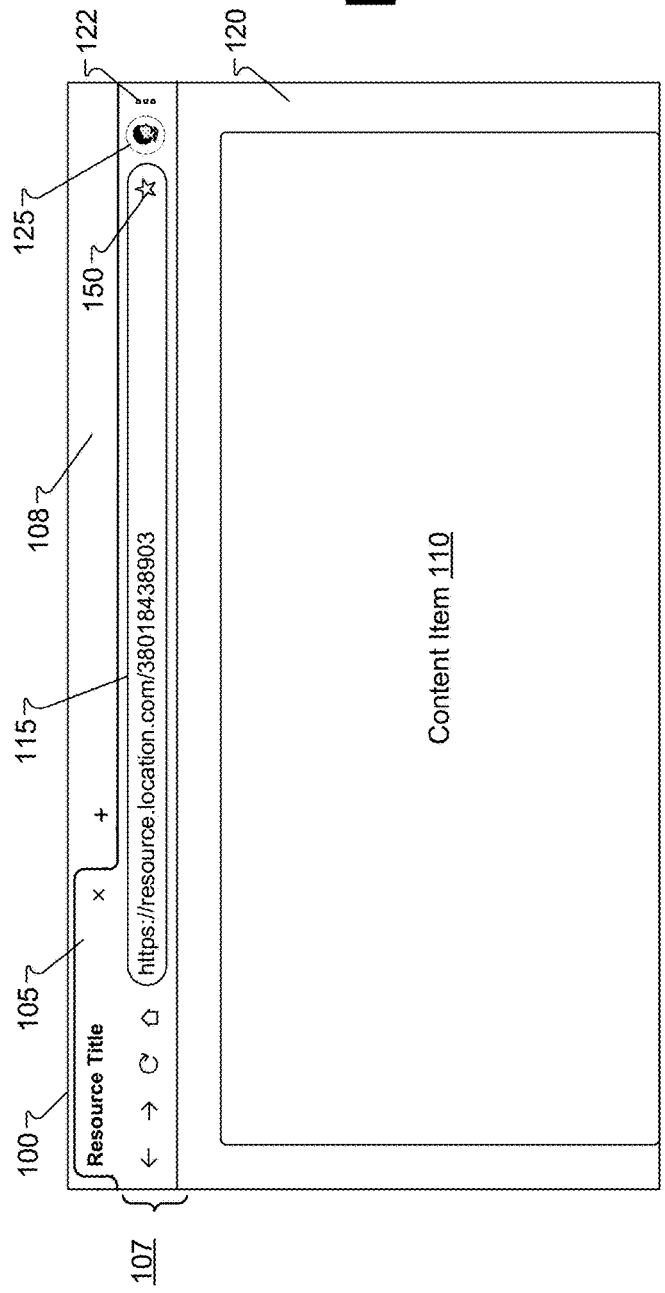
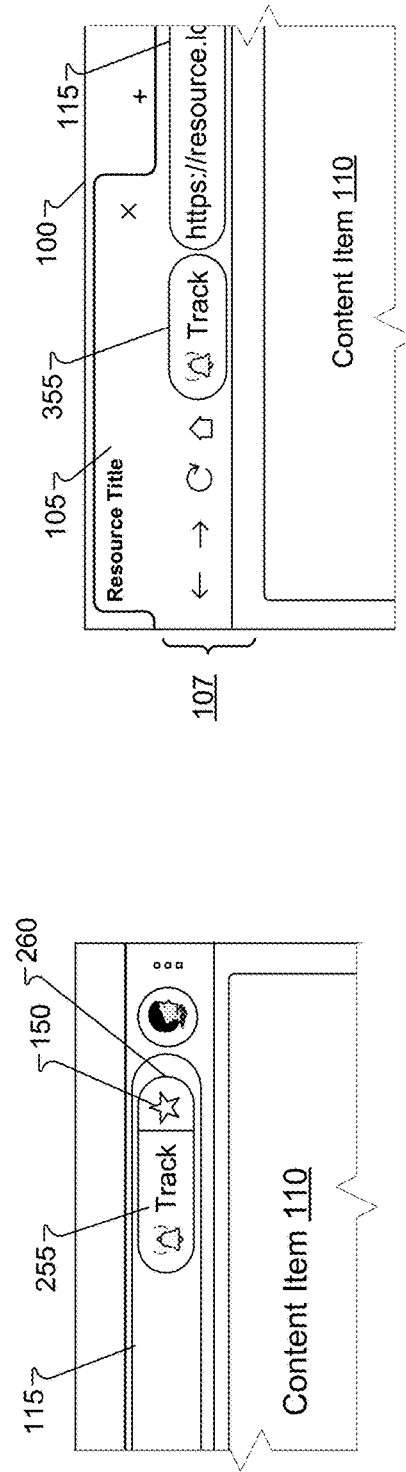

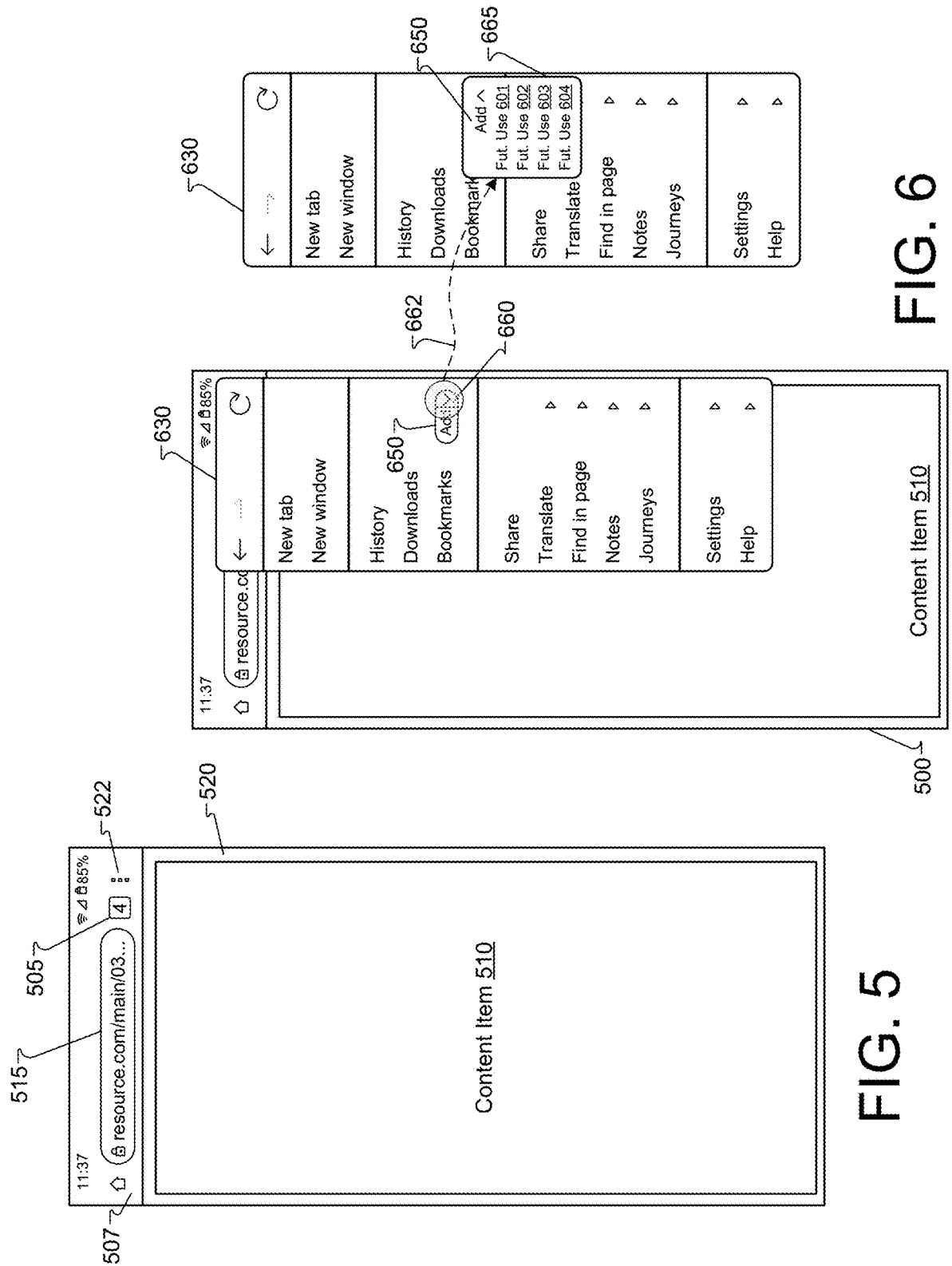

FUTURE USE INTENTS FOR SAVED RESOURCES IN A BROWSER ENVIRONMENT

CROSS REFERENCE TO RELATED APPLICATION

This application claims the benefit of Provisional Application No. 63/370,756, filed Aug. 8, 2022, the disclosure of which is incorporated herein by reference in its entirety.

BACKGROUND

Websites provide information or functionality helpful to users and many users use a browser connected to the Internet to research products, places, companies, services, etc. Most browser applications provide a user with the ability to save a location of a website, e.g., via a bookmark, favorite, internet shortcut, etc. These saved resources can be organized by the user into folders.

SUMMARY

Implementations provide an improved browser application that helps a user organize, find, and act on information accessed while browsing the Internet. For example, the improved browser application can provide a user interface that suggests additional actions to select and take with respect to a content item. These additional actions can be referred to as future use intents. In other words, a user may save a content item to saved resources for a variety of future uses. Future use intents represent specific types of future uses, e.g., specific actions that a user can take with respect to the content item. In disclosed implementations, in addition to bookmarking a content item, the improved browser may provide shortcut user interface elements, referred to as intent controls, that the user can select to add an item to an intent-based tracker. Implementations that include suggested intents provide a predictive input mechanism. The predictive input mechanism, in the form of an intent control, is surfaced (rendered in the browser interface) in response to analysis of a content item that determines a particular future use intent is appropriate for the content item currently displayed. Implementations can include one or more types of future use intents. As used herein, type of a future use intent specifies, indicates, and/or refers to a particular type of a particular future use intent. Therefore, the use of the terms type of future use intent and future use intent may be seen as being interchangeable because a determination, use and/or selection of a particular type of future use intent leads to a determination, use and/or selection of a particular future use intent of the respective type and because a determination, use and/or selection of a particular future use intent leads to a determination, use and/or selection of a particular type of future use intent.

The details of one or more implementations are set forth in the accompanying drawings and the description below. Other features will be apparent from the description and drawings.

BRIEF DESCRIPTION OF THE DRAWINGS

FIG. 1 illustrates an example browser application user interface, according to some aspects.

FIG. 2 illustrates the example browser application user interface of FIG. 1 with a future intent control, according to an aspect.

FIG. 3 illustrates the example browser application user interface of FIG. 1 with a future intent control, according to an aspect.

FIG. 5 illustrates an example browser application user interface, according to some aspects.

FIG. 6 illustrates the example browser application user interface of FIG. 5 with a future intent control, according to an aspect.

DETAILED DESCRIPTION

Figure 4A:
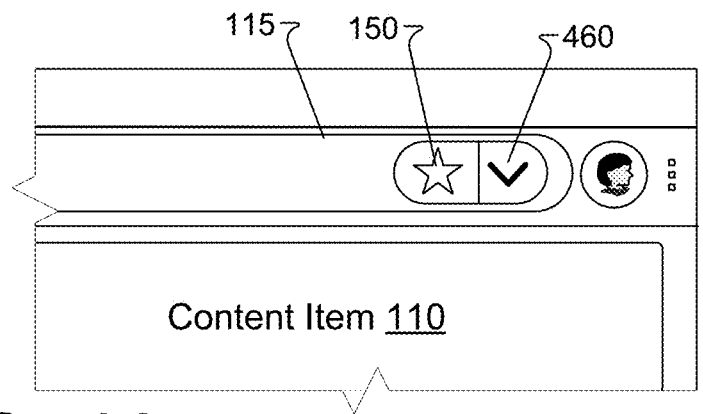
FIGS. 4A-4B illustrate the example browser application user interface of FIG. 1 with a future intent control, according to an aspect.

Implementations relate to providing improved tools for navigating the internet and resuming activities. While most browser applications provide a way to save visited locations, many of these saved resources do not, in fact, get used. Instead, a user may select and use a few bookmarks as navigation shortcuts for frequently accessed items, but may not actually select and use most of the bookmarks. These unused bookmarks represent a future intent that never materialized. These intended future uses can vary. One type of future use intent can include tracking a characteristic (numerical attribute) of an item. One type of future use intent can include adding a reminder for a content item. One type of future use intent can include adding a content item to a reading list to read later. One type of future use intent can be adding a note to the item. The saved resources associated with a future use intent (e.g., listed in an intent tracker) may not be listed among saved resources lacking a future use intent association. The content items on the intent-based tracker may be less enduring than a bookmark. For example, the saved resources associated with an intent tag (the intent tag identifying the type of future use intent) and displayed in an intent tracker can expire after a prespecified time period. In some implementations this time period can be specified and/or modified by the user. In some implementations, one or more types of future use intents may be listed among saved resources lacking future use intent association. For example, a resource associated with a note future use intent type may be displayed with other saved resources not associated with any future use intent types.

Implementations provide an improved user interface to associate a saved resource with a particular kind of intent, e.g., by associating the saved resource with a future use intent tag. As used herein, a future use intent tag can be any information or data structure that identifies and/or represents the type of future use intent associated with the saved resource. For example, a future use intent tag can be a label attached to the saved resource; the label having a value that represents a specific type of future use intent. A future use intent tag can be a particular object attached to/saved with the saved resource. For example, a tracking future use intent may be represented by an object attached to the saved resource. This object may represent the attributes of a tracking future use intent, e.g., an entity, the numerical attribute to be tracked, and/or the initial value of the attribute. Other future use intents may be represented by other objects that include data relating to the future use intent type.

A technical effect of disclosed implementations is the ability of a system to intelligently recommend tags for different content items. Thus, intent controls, which are used to associate a future use intent tag with a saved resource, can be proactively added where the content item currently being viewed is appropriate for that particular future use intent. The intent controls are user interface elements that provide a shortcut for associating specific future use intents with a saved resource, enabling a user to directly associate the future use intent (e.g., via an intent tag) with a content item and save the intent tag and the content item identifier in the saved resources with one action. Put another way, selection of a future use intent control (i.e., a type of future use intent) can have the technical effect of simplifying user interaction with the user interface because the future use intent control is a shortcut for a sequence of corresponding user interactions with the user interface and because by selecting a future use intent control, the user performs only one interaction instead of the respective sequence of corresponding user interactions with the user interface. In addition, the saved resources associated with intent tags can be tracked independently of other saved resources, e.g., by intent trackers. The intent trackers are user interfaces that automatically organize saved resources by future use intent type, making it easier for the user to resume a particular kind of activity. As another technical effect, the system (browser) may automatically act on these saved resources associated with future use intents (i.e., intent tags), e.g., saving the user from performing user interactions with the user interface to perform the action, making the saved resources more useful. In other words, disclosed implementations support a user's search for content and assist the user in searching for the content by a continued and/or guided human-machine interaction process. The system may also automatically clean up future use intents.

FIG. 1 illustrates an example browser interface (UI) 100, in accordance with implementations described herein. In general, the UI 100 is generated and rendered by a browser application (e.g., browser application 1418 of FIG. 14) executing in an operating system (e.g., operating system 1410) of a computing device. The UI 100 includes a tab strip 108 associated with the browser application. In this example, the UI 100 includes one browser tab 105, although any number of browser tabs or tab groups can be opened by the browser application. Each browser tab, e.g., browser tab 105, may be associated with a content item 110 (e.g., web content, a webpage, an online resource, web application, etc.) presented in a corresponding browser content window 120 of the browser application. As used herein, a content item refers to any content rendered by the browser application, which may be generated or served at least partially by/from a server, e.g., a server hosting a website, web application, or other online resource. A content item can thus be any resource associated with a resource identifier. Examples of resource identifiers are URLs (Universal Resource Locators) or URIs (Universal Resource Identifiers). In addition, as used herein, a content item refers to the webpage (resource) currently rendered in the browser content window 120 as well as any other data (metadata) that is used to render the document (e.g., markup and scripts that are not actually displayed), and models generated for rendering the content item 110 (e.g., document object models, accessibility models).

The UI 100 also includes an address bar area 107. An address of the webpage displayed in the browser content window 120 can be illustrated in the address bar area 107 (e.g., in address input area 115). The address input area 115 enables a user to provide, for example, a resource identifier for a content item. The address input area 115 can also be used for searching, e.g., for entering search terms that are provided to a search engine. An address input area 115 with this additional capability can be referred to as an omnibox. Other controls, icons, and/or so forth can be included in the address bar area 107. For example, the address bar area 107 can include a user icon 125. The user icon 125 may provide an indication of a user account associated with the browser session. This user icon 125 can be an image, text, or some other representation of the user account. Other controls/icons conventionally included in the address bar area 107 include a forward control, a back control, a refresh control, a home control, an extensions control, and/or a saved resource control 150, and a utility menu control 122. The address bar area 107 can be controlled by and/or associated with the browser (e.g., the browser application 1418). The content of the address bar area 107 can be controlled by the browser application, whereas the content of the browser content window 120 is controlled by the content item 110 being displayed and/or a provider of the webpage. The saved resource control 150 is used to add the resource identifier (e.g., the URL) of the content item 110 to a saved resource storage area, e.g., local saved resource storage 1426 of FIG. 14. The saved resources can be referred to as bookmarks, favorites, internet shortcuts, and the like.

FIG. 2 illustrates the example browser application user interface of FIG. 1 with an intent control 255 added to the address input area 115, according to an aspect. In the example of FIG. 2, the UI 100 is only partially shown, e.g., representing the upper right portion of the UI 100 of FIG. 1. In the example of FIG. 2, the intent control 255 is added next to (proximate) a saved resource control 150. In the example of FIG. 2, the browser application has analyzed, e.g., using intent detection model(s) 1422 of FIG. 14, the content item 110 and determined that an attribute tracking future use intent applies to the content item 110. Although an attribute tracking future use intent type is illustrated, any type of future use intent can be identified as associated with the content item 110. In addition, a content item 110 can be associated with more than one future use intent type. In response to determining that the content item 110 is associated with the tracking future use intent, the browser application is configured to provide (surface/render) intent control 255. An intent control is a selectable control (e.g., selectable by a user) that is configured, in response to being selected, to add a future use intent tag to a saved resource (e.g., bookmark, favorite). The intent control can be any selectable control, such as a selectable icon, a selectable image, selectable text (e.g., a link), a labeled toggle control (slider, radio button, checkbox, etc.). In the example of FIG. 2, the browser application changes the appearance of the saved resource control 150, adding the intent control 255 and enclosing the saved resource control 150 and intent control 255 within an outline 260. Although illustrated in FIG. 2 as an oval, the outline 260 can be any shape and, in some implementations, is optional. In some implementations the outline 260 can be referred to as a chip. The chip may be added to the address input area 115, as illustrated in FIG. 2. Selection of the intent control 255 may initiate a process for adding a location identifier (e.g., URL/URI) of the current content item 110 to be added to a list of saved resources with a future use intent tag, as described herein. Thus, intent control 255 is an example of an intent control that is a shortcut for a sequence of corresponding user interactions with the user interface. In other words, the user need not save the location identifier of the content item 110, navigate to a saved resource user interface that lists saved resources, locate the entry for the content item 110, and edit the content item to associate the intent tag (representing the attribute tracking type of future use intent) to the saved resource. The browser application may be configured to add intent control 255 to the UI 100 (e.g., the address bar area 107) automatically in response to determining that content item 110 is associated with the attribute tracking intent. In this sense, the intent control 255 can be considered a suggested future use intent appropriate for the content item 110. Although the example of FIG. 2 illustrates one future use intent, implementations may display a future use intent control for each type of future use intent associated with the content item 110. In addition, implementations can include other placement of the intent control 255 in the UI 100, e.g., to the right or left of the address input area 115 in the address bar area 107 or elsewhere in the address bar area 107, etc.

FIG. 3 illustrates the example browser application user interface of FIG. 1 with a future intent control 355 added to the address bar area 107, according to an aspect. In the example of FIG. 3, the UI 100 is only partially shown, e.g., representing the upper left portion of the UI 100 of FIG. 1. In the example of FIG. 3, the browser application has analyzed, e.g., using intent detection model(s) 1422 of FIG. 14, the content item 110 and determined that an attribute tracking future use intent applies to the content item 110. In response to determining that the content item 110 is associated with the tracking future use intent, the browser application may be configured to surface future intent control 355 in the address bar area 107 of UI 100. In some implementations, the address input area 115 may shrink to make room for future intent control 355. The future intent control 355 can also be referred to as a chip added to the address bar area 107. The future intent control 355 is configured similar to intent control 255. Accordingly, selection of future intent control 355 initiates a process for adding a location identifier of the content item 110 to a list of saved resources with a future use intent tag. An intent tag identifies the type of future use intent associated with the content item. In other words, the value of an intent tag may indicate the type of the future use intent. This value can be numeric or alpha-numeric. For example, a value of 1 for an intent tag may correspond to a reminder intent, a value of 2 to an attribute tracking intent, a value of 3 to a read later intent, etc. Implementations are not limited to this specific example of intent tag values. Although the example of FIG. 3 illustrates one future use intent, implementations may display a future use intent control for each type of future use intent associated with the content item 110. In addition, implementations can include other placement of the future intent control 355 in the address bar area 107, e.g., to the right of the address input area 115, inside the address input area 115, etc.

Figure 4B:
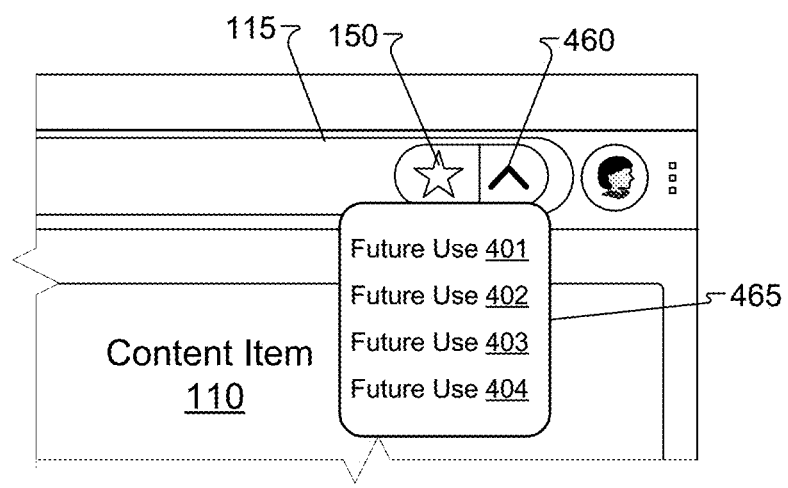

FIGS. 4A and 4B illustrate the example browser application user interface of FIG. 1 with an intent control 460 added next to a saved resource control 150 in the address input area 115, according to an aspect. In the example of FIG. 4A, the UI 100 is only partially shown, e.g., representing the upper right portion of the UI 100 of FIG. 1. In the example of FIG. 4A, the intent control 460 is a drop-down control. The drop-down control is configured to, when selected, provide access to one or more intent controls.

According to an implementation, the browser application may provide/render the intent control 460 for all content items. In other words, in addition to providing saved resource control 150 for all content items, the browser application may be configured to provide intent control 460 for all content items. In such implementations, an intent picker 465 (illustrated in FIG. 4B) is a user interface element and may include a respective intent control for each type of future use intent supported by the browser application. (e.g., intent control 401, intent control 402, intent control 403, intent control 404, etc.). In other words, each intent control (401, 402, etc.) in the intent picker 465 is associated with a respective type of future use intent. In the example of FIG. 4B, the browser application may support four future use intent types. Thus, the intent picker 465 may display four intent controls, one for each type of future use intent supported by the browser application. In the example of FIG. 4B, the intent controls 401, 402, 403, 404 are selectable links. The text of the link may be a description of the type of the future use intent. Selection of an intent control of the in the intent controls 401, 402, 403, 404, may cause the browser application to add the resource identifier for the content item 110 to be added to a data store of saved resources and to be associated with an intent tag that represents the type of intent associated with the selected intent control.

Figure 14:
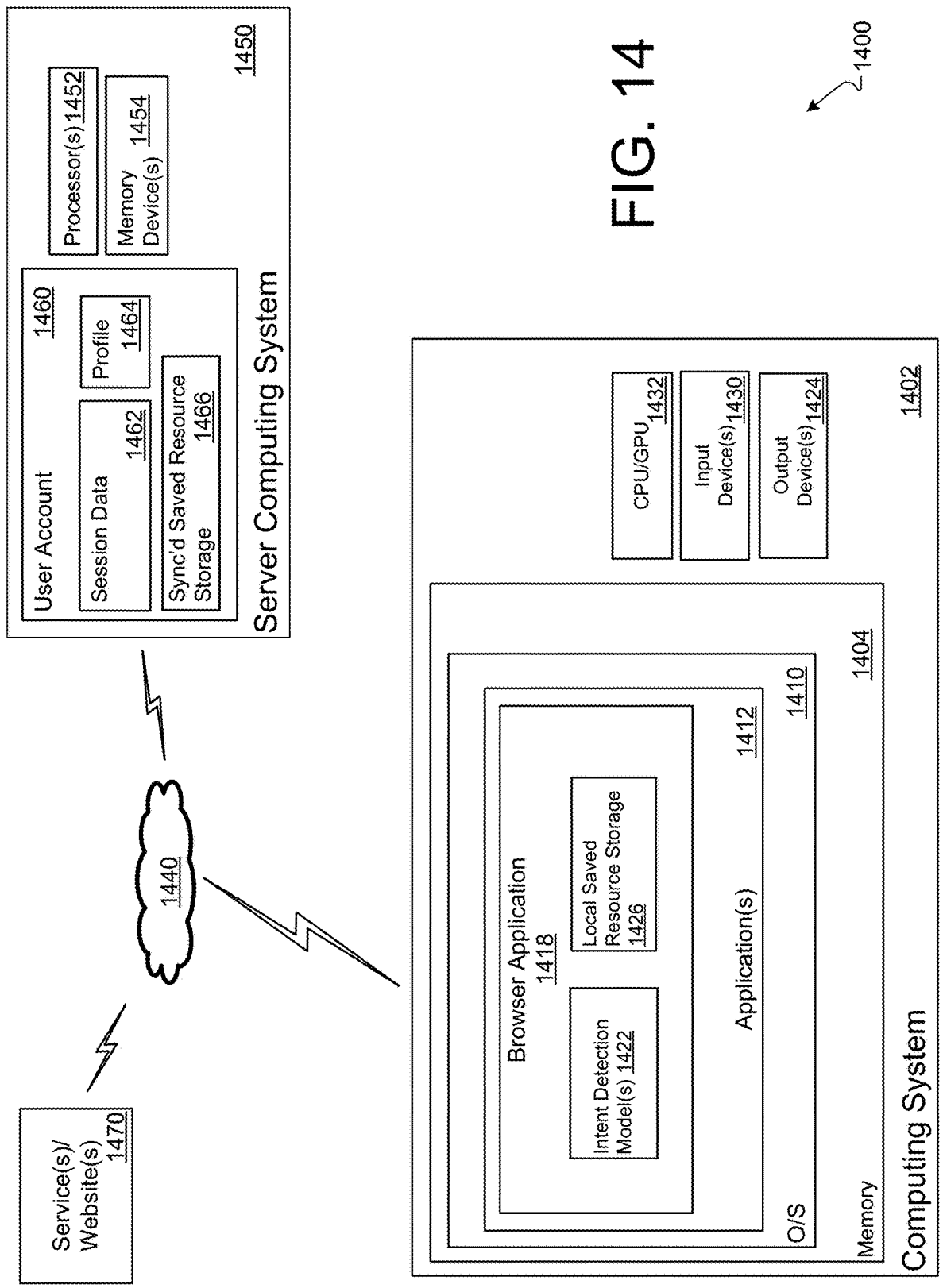
FIG. 14 illustrates a system for providing future-use intents for saved resources in a browser application, according to an aspect.

According to an implementation, the browser application may have analyzed, e.g., using intent detection model(s) 1422 of FIG. 14, the content item 110 and determined that at least one future use intent type is associated with the content item 110. In response to determining that the content item 110 is associated with at least one future use intent type, the browser application may be configured to provide (render) future use intent control 460 in the address bar area 107 of UI 100. In such implementations, the intent control 460 is not rendered (provided) for all content items. Instead, the browser application provides intent control 460 when the content item 110 is determined to be appropriate for at least one future use intent. In some such implementations, the intent picker 465 may include an intent control only for the future use intent types determined to apply the content item 110 (currently displayed in the browser content window 120).

According to some implementations, the browser application may provide intent control 460 for all content items, but the intent picker 465 may only list an intent control for a default future use intent and intent controls for future use intent types determined to be applicable to the content item 110 currently displayed in browser content window 120. In other words, the browser application may be configured to provide an intent control for a default future use intent type (e.g., a read later intent) for all content items and may provide one or more other intent controls for future use intent types determined (e.g., via analysis of the content item 110) to be applicable to content item 110. In such implementations, the intent picker 465 may display intent control 401 for all content items (representing a default future use intent type) and may display zero, one, or more of the other intent controls 402, 403, 404, etc., depending on the result of the analysis.

FIG. 5 illustrates an example browser user interface 500, according to some aspects. The UI 500 is an example interface for a device with a smaller display area, sometimes referred to as a mobile device. A mobile device can include a wearable (smart watch, AR/VR glasses, a smartphone, a tablet, etc. The UI 500 has elements like those of UI 100. For example, address bar area 507 may be like address bar area 107, address input area 515 may be similar to address input area 115, and utility menu control 522 may be similar to utility menu control 122. UI 500 may also include tab switcher 505. The tab switcher 505 may be a selectable element that, in response to being selected, causes the browser application to display an interface where open browser tabs are displayed and can be selected. The browser content window 520 displays a content item 510 that corresponds to the location displayed in the address input area 515.

FIG. 6 illustrates the example browser user interface 500 of FIG. 5 with an intent control 660, according to an aspect. In the example of FIG. 6, the user has selected the utility menu control 522 and, in response, the browser application has provided (rendered/caused to be displayed) options menu 630. In some implementations, options menu 630 includes saved resource control 650 and intent control 660, which operate in a manner like saved resource control 150 and intent control 460, respectively, of FIG. 4A. Accordingly, if a user selects intent control 660 (e.g., represented by selection 662), the browser application may cause intent picker 665 to be displayed. The intent picker 665 operates in a similar manner as the intent picker 465 of FIG. 4B. Thus, the intent picker 665 may include one or more intent controls, depending on the implementation (e.g., showing all future use intents supported by the browser application, showing future use intents applicable to the content item 510, or showing a default future use intent and any additional future use intents applicable to the content item 510). The intent controls illustrated in FIG. 6 are (user selectable) links with a description corresponding to the type of future use intent, but the intent controls can take other forms (e.g., toggle controls with a description, selectable icons, selectable images, etc.).

Figure 7:
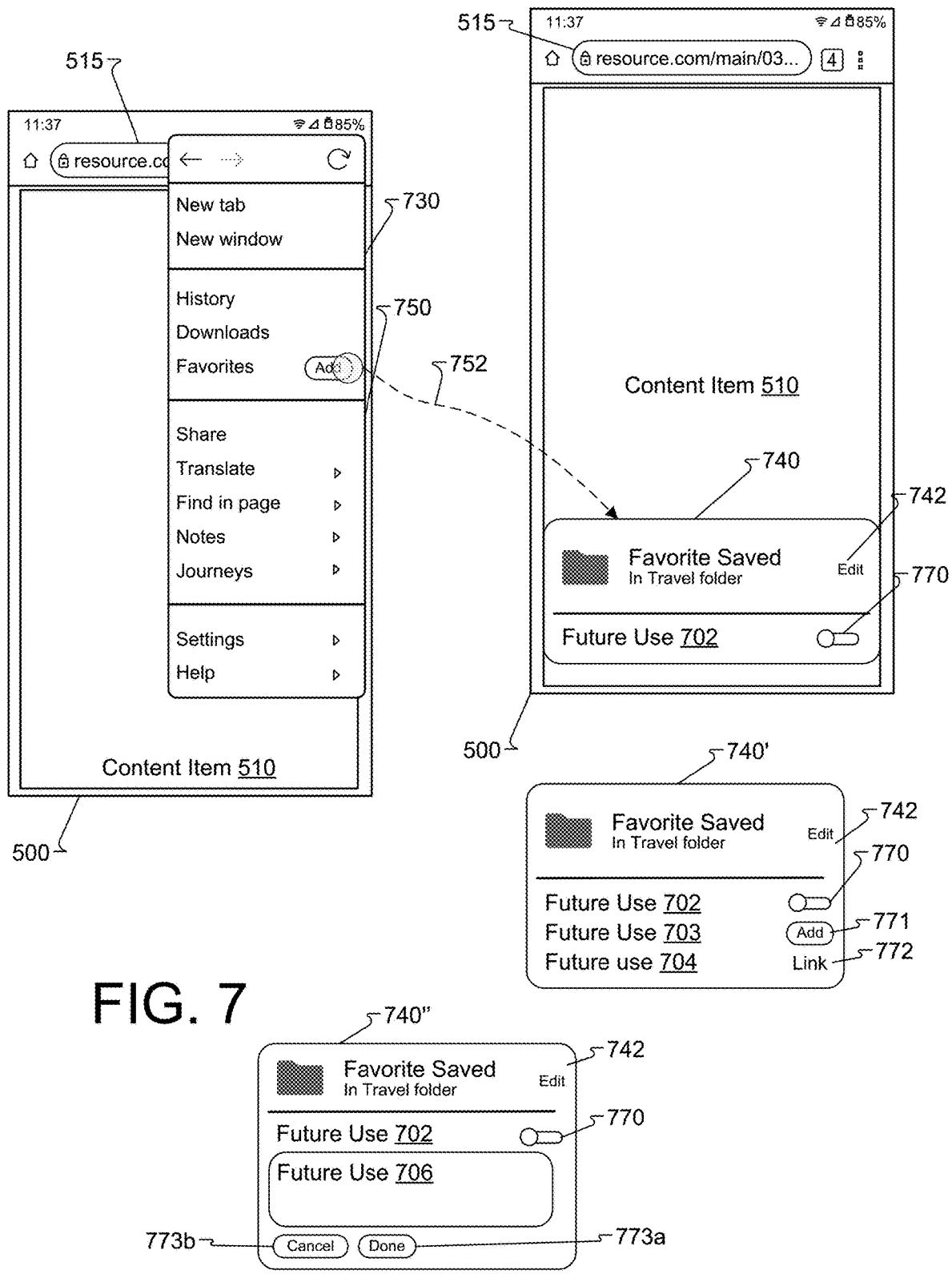
FIG. 7 illustrates the example browser application user interface of FIG. 5 with a future intent control, according to an aspect.

FIG. 7 illustrates the example browser application user interface of FIG. 5 with an intent control 770, according to an aspect. In the example of FIG. 7, the user has selected the utility menu control 522 and, in response, the browser application has provided (rendered/caused to be displayed) options menu 730. In some implementations, options menu 730 includes saved resource control 750. Saved resource control 750 may be configured to, in response to selection, add an identifier for content item 510 to a datastore of saved resources (list of saved resources, list of bookmarks, list of favorites, etc.). In the example of FIG. 7, selection of saved resource control 750 causes a saved resource confirmation window 740 to appear. The confirmation window 740 is an example of a confirmation interface. The confirmation window 740 may provide an indication that the content item 510 has been saved in the saved resources. In some implementations, the confirmation window 740 can include an edit control 742. The edit control 742 may be configured to, in response to being selected, provide the user with an opportunity to edit the title of the saved resource, organize the saved resource (e.g., change a folder assigned to the saved resource, change the location of the saved resource, remove the saved resource from the datastore of saved resources, etc.

In addition, the confirmation window 740 can include intent control 770. In the example of FIG. 7, the intent control 770 is a toggle control. A toggle control is a control with a binary value. In FIG. 7 the values represent the presence or absence of an association of a particular future use intent, i.e., future use 702, with the saved resource. Selection of the intent control 770 (e.g., illustrated as selection 752) may cause the browser application to add or remove an intent tag to a saved resource, as described herein. In the example of FIG. 7, the future use 702 may be suggested because an analysis of the content item 510 determines that the future use 702 is applicable to the content item 510. In this sense, the confirmation window 740 may include two or more intent controls, each corresponding to a future use intent determined to be applicable to the content item 510. Confirmation window 740' illustrates multiple future use intent controls, e.g., intent controls 770, 771, and 772. In some implementations, intent controls 771 and 772 may be displayed in confirmation window 740' due to the future use intent being determined (e.g., via analysis of the content item 510) to be applicable to the content item 510. Confirmation window 740" is another example of multiple future use intent controls, e.g., controls 770, 773a and 773b. In the example of confirmation window 740" the future use 706 may be a text-based future use, such as a note intent. Control 773a enables a user to add the text as future use 706. (e.g., a note object/note intent). Control 773b is configured to ignore text provided as future use 706 without updating/adding future use 706. In some implementations, the intent controls 770, 771, and 772 may be included because the browser application supports the future use intents. In other words, no analysis of content item 510 may be needed. In some implementations, one or more of the intent controls 770, 771, or 772 may be a default future use intent. For example, intent control 770 may be provided because it is a default future use intent, and intent control 771 may be provided because it is determined to be applicable to the content item 510 that is the subject of the saved resource. The intent controls 770, 771, and 772 are not limited to toggle controls and may include other types of controls, such as a link illustrated by intent control 772 or a button illustrated by intent control 771.

Figure 8:
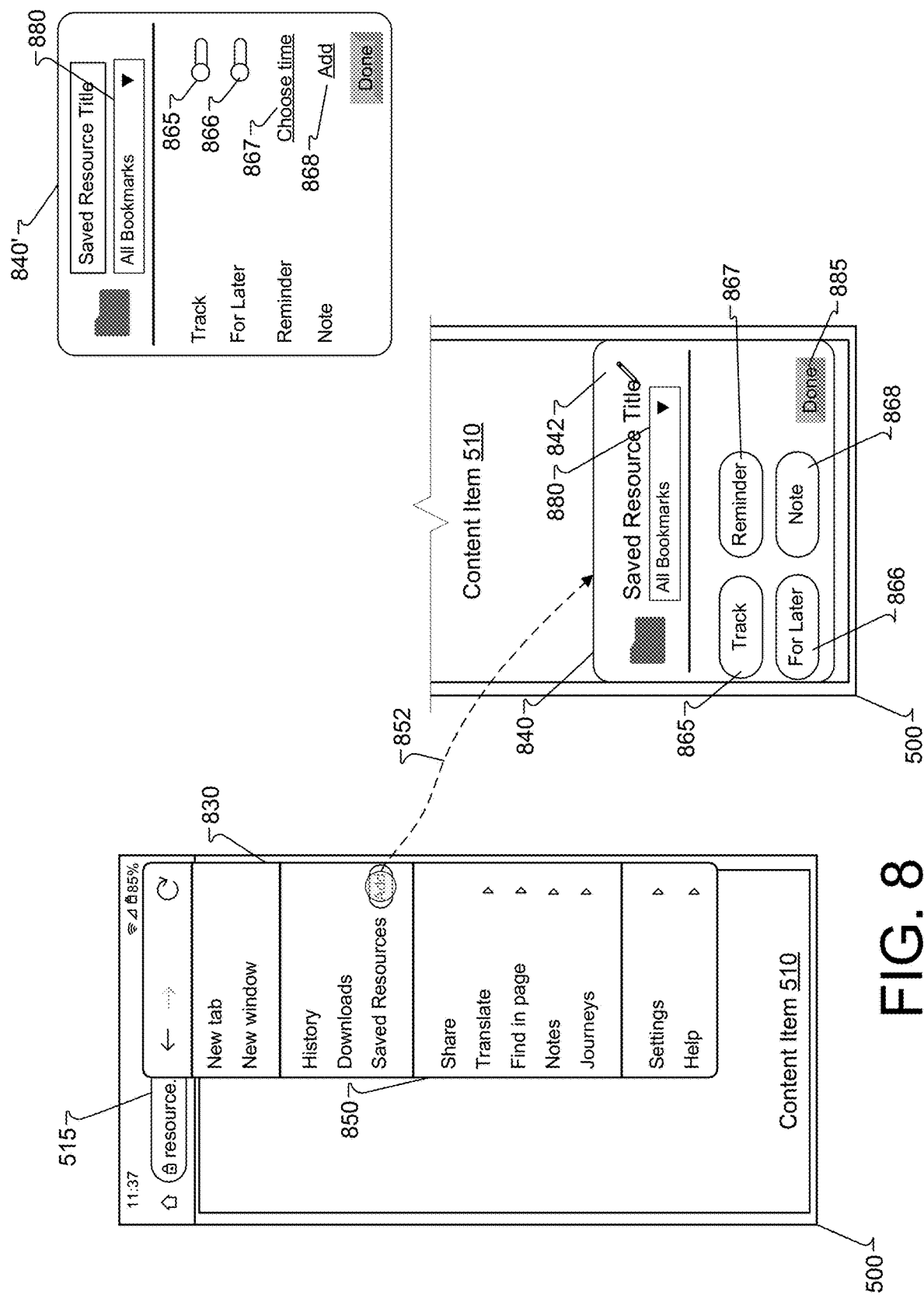
FIG. 8 illustrates the example browser application user interface of FIG. 5 with a future intent control, according to an aspect.

FIG. 8 illustrates the example browser application user interface of FIG. 5 with an intent control 865, according to an aspect. In the example of FIG. 8, the user has selected the utility menu control 522 and, in response, the browser application has provided (rendered/caused to be displayed) options menu 830, which includes saved resource control 850. Options menu 830 may operate in a manner similar to options menu 730. In the example of FIG. 8, in response to selection of the saved resource control 850 (e.g., illustrated as selection 852), the saved resource control 850 may be configured to initiate display of (cause to render, etc.) saved resource confirmation window 840. The confirmation window 840 is an example of a confirmation interface. The confirmation window 840 may be an intermediate step to adding an identifier for content item 510 to a datastore of saved resources. In other words, selection of saved resource control 850 may not cause a location for content item 510 to be saved but instead may cause the confirmation window 840 to be displayed where the user can confirm addition of the location for the content item 510 to the datastore of saved resources, e.g., by selecting the confirmation control 885. Before adding the saved resource, confirmation window 840 may provide the user with an opportunity to select a folder (e.g., via control 880) and/or edit the title of the saved resource, e.g., via edit control 842.

In addition, the confirmation window 840 can include intent control 865, intent control 866, 867, and/or intent control 868. The intent controls 865, 866, 867, and 868 may be configured to associate a particular type of future use intent with the saved resource. For example, selection of the intent control 865 may associate an attribute tracking intent with the saved resource for content item 510. In other words, a future use intent tag may be associated with the saved resource in response to selection of the intent control 865. Similarly, selection of the control 867 may associate a reminder intent tag with the saved resource. In some implementations, selection of the intent control 865 may also bring up an interface for adding a reminder time for the reminder intent, e.g., obtaining a reminder time from the user. In some implementations, the intent controls 865, 866, and 867 operate as other intent controls described herein, e.g., in FIGS. 2, 3, 6, and 7. In some implementations, an intent control can be configured to generate (e.g., initiate display of) a user interface where the user can add attributes to a future use intent tag.

In some implementations, intent controls 865, 866, 867, and 868 may be displayed in confirmation window 840'. Confirmation window 840' may be used in implementations with larger display area (e.g., a tablet or desktop as opposed to a mobile phone). Thus, although the layout differs, the controls 865, 866, 867, and 868 are configured as described above.

Figure 9:
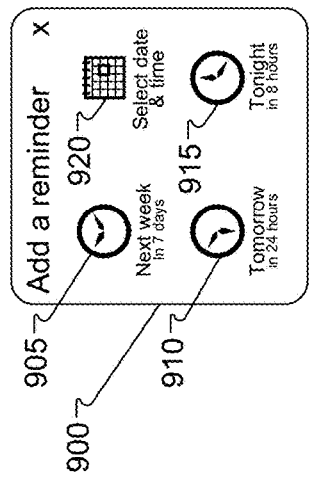
FIG. 9 illustrates the example reminder intent user interface, according to an aspect.

FIG. 9 illustrates the example reminder intent user interface 900, according to an aspect. Selection of intent control 867 of FIG. 8 may cause reminder intent user interface 900 to be displayed. The reminder intent user interface 900 may enable a user to provide additional data (metadata or attributes) to a future use intent. In the example of FIG. 9, the reminder intent user interface 900 includes options for suggested reminder times to associate with the reminder intent type. In this example, the suggested reminder times include a one week reminder 905, a one day reminder 910, and a 8 hour reminder 915. Selection of the one week reminder 905, one day reminder 910, or hour reminder 915 may cause the browser to associate the applicable time to the reminder intent tag. Put another way, the selection of the one week reminder 905 may cause the browser application to store a time one week from the current time with the reminder intent tag. The browser application may use this associated time, or reminder time, to push a notification to the user. The reminder intent user interface 900 may also include a calendar picker control 920 that enables the user to select a reminder time for the reminder intent from a calendar. The reminder intent user interface 900 is one example of a user interface that enables a user to associate attributes with a future use intent. Implementations can include other similar interfaces.

Figure 10:
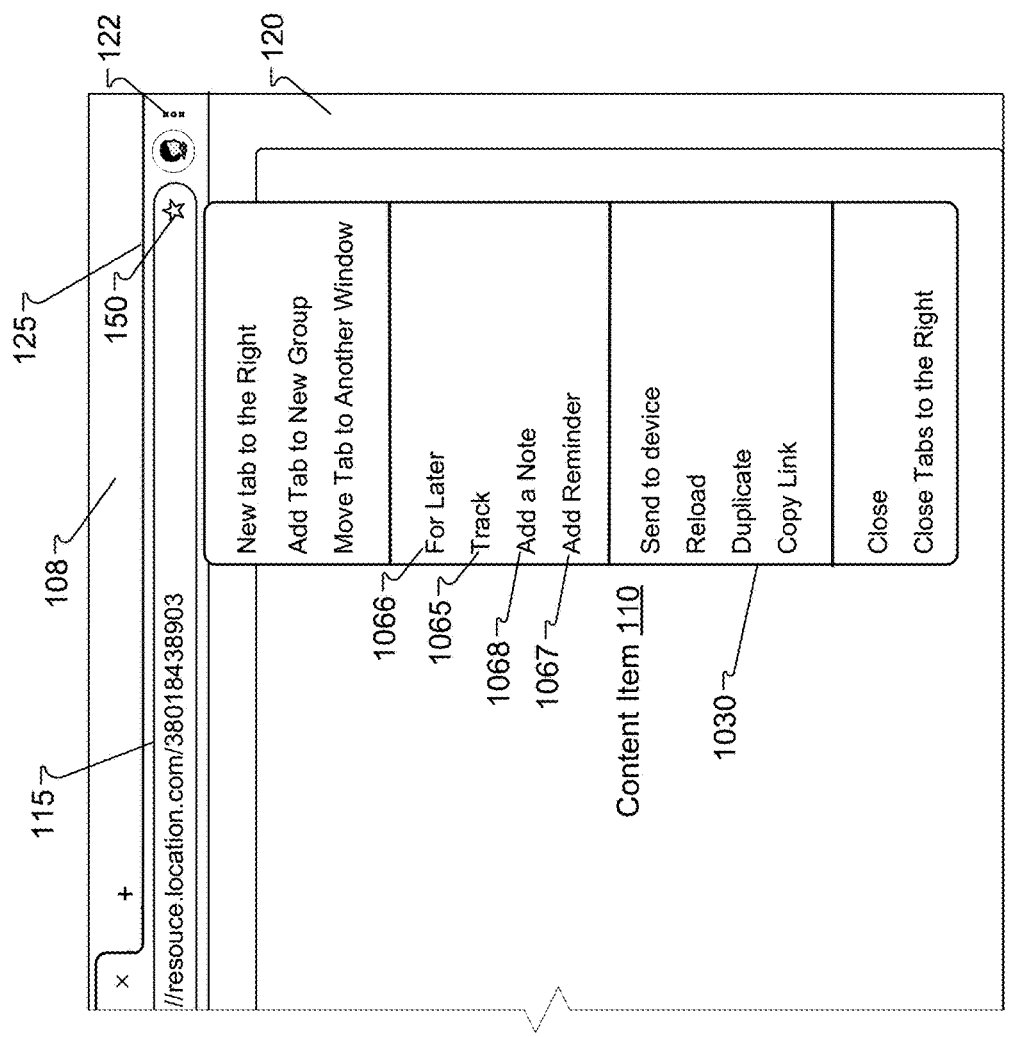
FIG. 10 illustrates the example browser application user interface of FIG. 1 with a future use intent control, according to an aspect.

FIG. 10 illustrates the example browser application user interface of FIG. 1 with an intent controls 1065, 1066, 1067, and 1068, according to an aspect. In the example of FIG. 10, the user has right-clicked in the content item 110 (e.g., the browser content window 120). The browser of the example illustrated by FIG. 10 is configured to provide options menu 1030 in response to a right-click of a content item. The options menu 1030, may include menu options for performing actions on the content item 110, but can also include one or more intent controls, such as intent controls 1065, 1066, 1067, and 1068. Although four intent controls are illustrated, implementations may not include all future use intents supported by the browser in the options menu 1030. For example, only future use intent controls that correspond to future use intents applicable to the content item 110 may be included in the options menu 1030 (e.g., as described with regard to FIGS. 4B, 7, and 8). In the example of FIG. 10, selection of the intent control 1066 may associate a read later intent tag with the location (reference identifier) for the content item 110 in the saved resources.

Similarly, selection of the intent control 1065 may associate an attribute tracking intent with the resource identifier of the content item 110 in the saved resources. In some implementations, the browser application may be configured to analyze the content item 110 to identify an entity (e.g., a main entity) represented in the content item 110 and associate the entity (e.g., an entity identifier) with the saved resource as an attribute of the saved resource. The browser may also identify an initial value of a numerical attribute for the entity to be tracked and associate this initial value with the saved resource. In some implementations, selection of the intent control 1065 may cause the browser to obtain selection of an entity represented in the content item 110, e.g., enabling the user to select an area of the display that corresponds to the entity and/or the numerical attribute to be tracked. In some implementations, the browser may select an entity and attribute to be tracked and provide an interface that enables the user to confirm or modify the entity and attribute to be tracked.

Selection of the intent control 1068 may associate a note intent (e.g., a note data object) with the resource identifier of the content item 110 in the saved resources datastore. Selection of the intent control 1068 may also cause a note user interface to be provided, where the user can provide other content to associate with the saved resource. The other content can include text provided by the user. The other content can include an image provided by the user (including via a copy-paste operation or via a resource identifier for the image). The note data object is an example of attributes of a saved resource with a future use intent. Selection of the intent control 1067 may operate similarly to intent control 867, e.g., associating a reminder intent with the saved resource that includes a future time (reminder time) attribute.

Figure 11A:
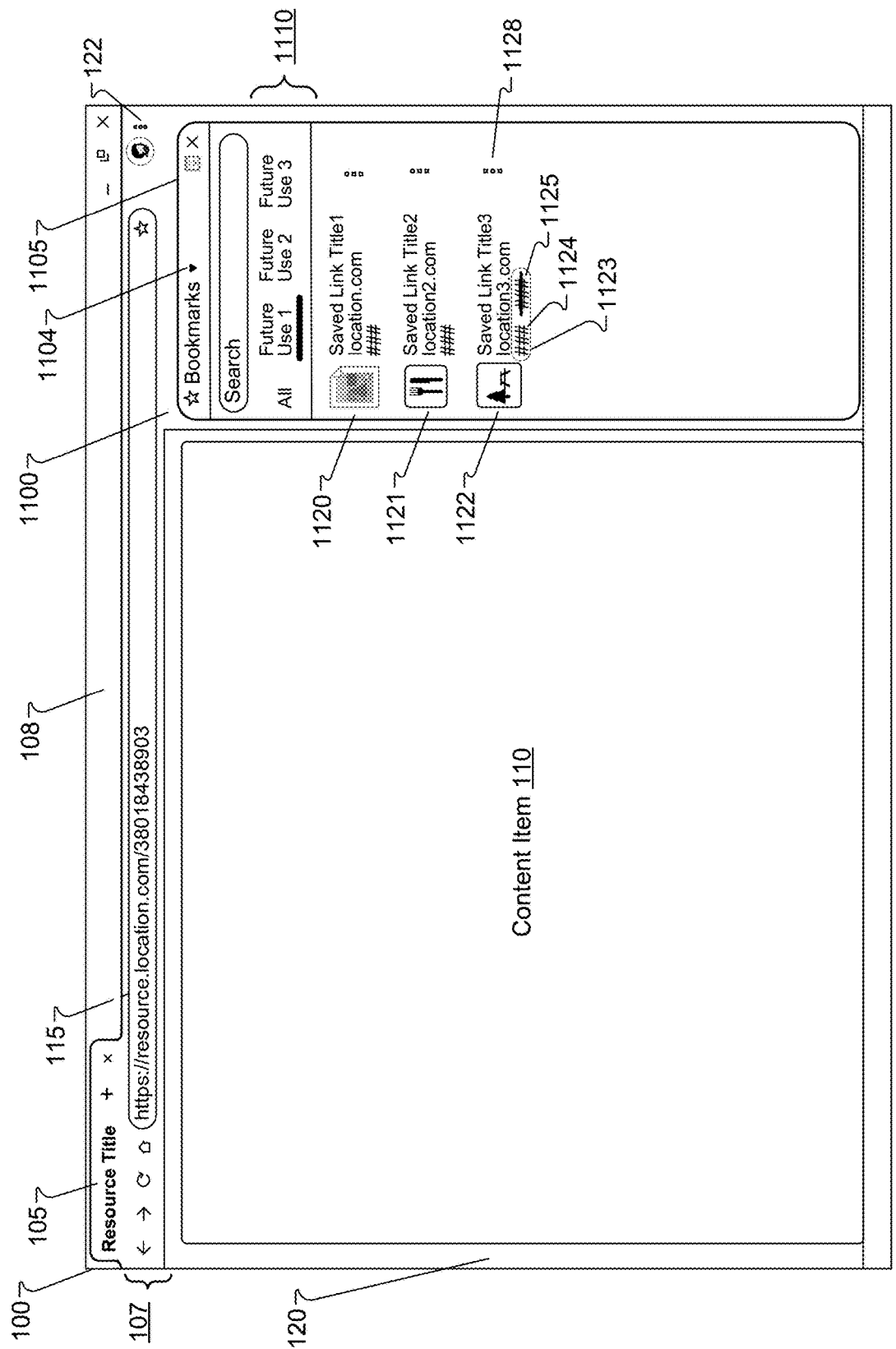
FIG. 11A illustrates an example browser application with an intent tracker interface, according to an aspect.

FIG. 11A illustrates an example browser UI 100 with an intent tracker interface 1105, according to an aspect. The UI 100 illustrated in FIG. 11A is similar to the UI 100 illustrated in FIG. 1 but includes a sidebar area 1100 not illustrated in FIG. 1. The sidebar of the browser may be a continuous area, e.g., a combined area representing the address bar area 107 and the sidebar area 1100. Thus, content displayed (rendered) in the sidebar is controlled (determined) by the browser and not by the website that is displayed (rendered) in the browser content window 120. Because the sidebar area 1100 is controlled by the browser application and integrated as part of the browser user interface 100 (e.g., address bar area 107), the sidebar area 1100 may not be spoofed (e.g., imitated) by, for example, a third party or the owner of the content item 110 displayed in the browser content window 120. Because the sidebar area 1100 is part of the application of the browser application, the sidebar area 1100 can be used by the browser application itself for providing user interfaces without obscuring the content item 110 in browser content window 120. While illustrated as a continuous area with the address bar area 107, the sidebar area 1100 can also be implemented as a split window, a pop-up window or some other portion of the browser UI 100.

In some implementations, the sidebar area 1100 may be surfaced (invoked, rendered) by a user, e.g., in response to selection of utility menu control 122. For example, in some implementations, the selection of the utility menu control 122 may open the sidebar with a default utility, which can be changed by selecting down arrow 1104. The browser application may use a saved resources utility as the default, e.g., providing a list of saved resources for the sidebar area 1100. In some implementations, the sidebar area 1100 showing intent tracker interface 1105 may be rendered (generated, provided) in response to selection of a saved resource option on a menu provided in response to selection of utility menu control 122. For example, selection of the utility menu control 122 may cause the browser application to provide a utility menu (e.g., similar to utility menu 1330 of FIG. 13) to be provided (rendered) and selection of a bookmark/favorites/saved resource menu option may cause the browser application to render the saved resources user interface in the sidebar area 1100 of FIG. 11A, e.g., by a rendering process of the browser application. In some implementations, the saved resources user interface in the sidebar area 1100 may be rendered in response to another browser application-provided command or control.

In the example of FIG. 11A, the sidebar area 1100 is displaying an intent tracker interface 1105. In the example of FIG. 11A, a saved resources user interface may include list selection area 1110. The list selection area 1110 may be configured with intent tracker controls to switch between the saved resources user interface and the intent tracker interfaces. In disclosed implementations, the saved resource user interface may display saved resources that are not associated with a future use intent tag. Saved resources that are associated with a future use intent tag may be displayed in an intent tracker interface. Thus, the list selection area 1110 may be configured with intent tracker controls. Intent tracker controls enable a user to select one of the browser-supported future use intents and, upon selection, to navigate to an intent tracker interface, i.e., displaying saved resources associated with a future use intent for the intent type selected. The list selection area 1110 may also enable a user to select no intent (i.e., displaying saved resources not associated with a future use intent tag). In the example of FIG. 11A, a user has selected Future Use 1 from the list selection area 1110, which is an example of an intent tracker control. Selection of this intent tracker control causes intent tracker interface 1105 to be rendered, displaying saved resources 1120, 1121, and 1122, which have (are associated with) a tag corresponding to future use 1. This future use intent can represent any of valid future use intents, or in other words, any future use intent supported by the browser application. Thus, the intent tracker interface 1105 enables a user to access saved resources associated with a particular type of future use intent. The intent tracker interface 1105 may also enable a user to manage saved resources without future use intents, e.g., by selecting the "All" control (link).

The list of saved resources associated with the type of future use intent corresponding to the selected intent type in list selection area 1110 can include various elements, such as an image (including an icon) representative of the saved resource, a title for the saved resource, an identifier of the saved resource, and an indication of the future use intent. Each of the saved resources 1120, 1121, and 1122 in the example of FIG. 11A include an icon/image, title, and location identifier. In addition, the intent tracker interface 1105 can include options menu control 1128 for each saved resource in the list of saved resources in intent tracker interface 1105. The options menu control 1128 is configured to provide a user interface in which the user can edit attributes associated with the shared location. The user interface provided in response to selection of the options menu control 1128 can also include an option for removing the shared location from the intent tracker. In other words, the user interface may enable a user to remove the future use intent tag from the shared location. In some implementations, this may cause the shared location to move from the intent tracker interface 1105 to the list of shared locations. In such implementations, metadata or attributes associated with the tag are also removed. In some implementations, removing the shared location from the intent tracker may delete the shared location entry in the datastore of shared locations.

In the example of FIG. 11A, the future use 1 is an attribute tracking intent. An attribute tracking intent tracks a numerical attribute of an entity. When an attribute tracking intent is associated with a saved resource, the browser application may also associate an initial value for the attribute with the saved resource. Thus, for example, if the numerical attribute is a forecasted high temperature for a particular day, the forecasted high temperature for that day may be stored as an initial value for the attribute along with the location of the content item representing the forecast for the day. In another example, if the numerical attribute is a price, the system may store the price the item (entity) is listed (offered) for in the content item. The intent tracker interface 1105 may list an updated value for the numerical attribute, if the value has changed from the initial value. In some implementations, this may be done by modifying the indication of the future use intent. Thus, in the example of FIG. 11A, saved resource 1122 has an initial value of 1125 which has changed. In the example of FIG. 11A, the updated value 1124 is listed and an appearance of the initial value 1125 is changed to indicate the change. In the example of FIG. 11A, the initial value 1125 is displayed with strikethrough. In some implementations, an appearance of the initial value 1125 and the updated value 1124 are modified to highlight the changed value. For example, an outline 1123 may be added. The outline 1123 may also include a fill color that further changes the appearance of the initial value 1125 and the updated value 1124.

Figure 11B:
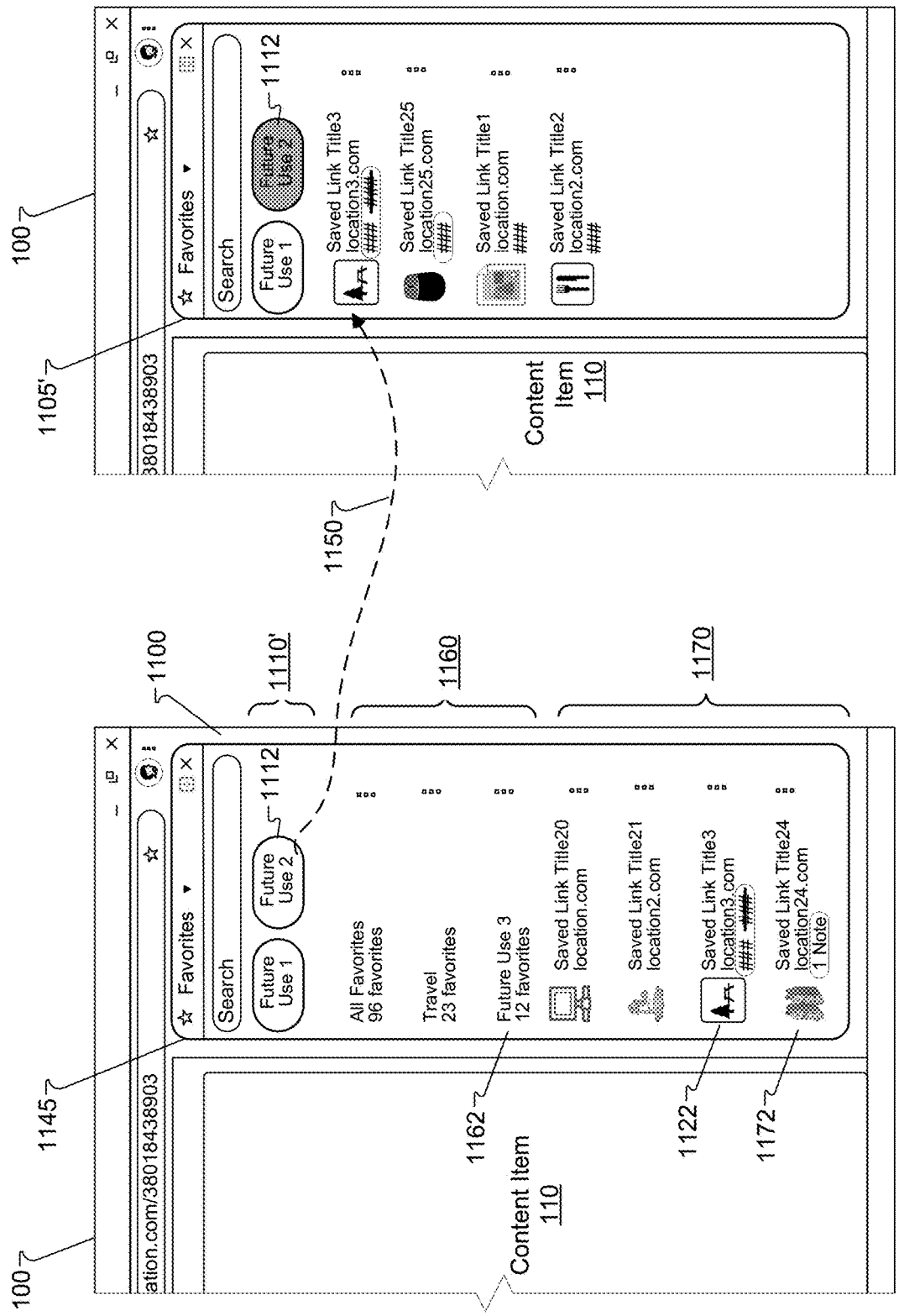
FIG. 11B illustrates an example browser application with an intent tracker interface, according to an aspect.

FIG. 11B illustrates an example browser UI 100 with an intent tracker interface 1105', according to an aspect. The UI 100 illustrated in FIG. 11B is similar to the UI 100 illustrated in FIG. 11A but the list selection area 1110 has been replaced with list selection area 1110'. In the example of FIG. 11B, the sidebar area 1100 displays a saved resources interface 1145 that displays saved resources. In the example of FIG. 11B, the list selection area 1110' includes two controls, each control corresponding to a respective future use intent. The controls in the list selection area 1110' are used to filter the saved resources displayed in the saved resources interface 1145. Filtering the saved resources displayed includes removing any saved resources from the displayed list of saved resources that are not associated with a future use intent tag corresponding to the selected control. Initially, the saved resources interface 1145 may display folders 1160 followed by saved resources 1170. In some implementations, one or more future use intents may be represented by a folder, such as folder 1162 of folders 1160. Each folder in the saved resources interface 1145 may be selectable, e.g., selecting the three dots may cause the saved resources associated with the future use 3 to be displayed.

The resources listed in the saved resources 1170 can have an indication of whether the saved resource is associated with a future use intent. In the example of FIG. 11B, saved resource 1122 has an attribute tracking future use intent and saved resource 1172 has a note intent. Thus, the saved resources 1170 listed in the saved resources interface 1145 can be, but are not necessarily, associated with a future use intent. In some implementations, the saved resources 1170 may be sorted by recency, although the saved resources 1170 may be sorted by other attributes, such as alphabetically, oldest, etc. The controls in the list selection area 1110' may be configured to switch to an intent tracker interface. In the example of FIG. 11B, selection 1150 of the Future Use 2 control 1112 results in the intent tracker interface 1105'. The appearance of the control 1112 for Future Use 2 may change, indicating that Future Use 2 is being used as a filter to change the saved resources interface 1145 to the intent tracker interface 1105'. Put another way, when control 1112 is selected, only saved resources associated with a future use intent corresponding to the future use of control 1112 are listed (e.g., saved resources not associated with the future use intent corresponding to the future use control 112 are excluded), converting the saved resources interface 1145 to the intent tracker interface 1105'. Another selection of the control 1112, e.g., toggling the control 1112, may revert the intent tracker interface 1105' to the saved resources interface 1145.

Figure 12A:
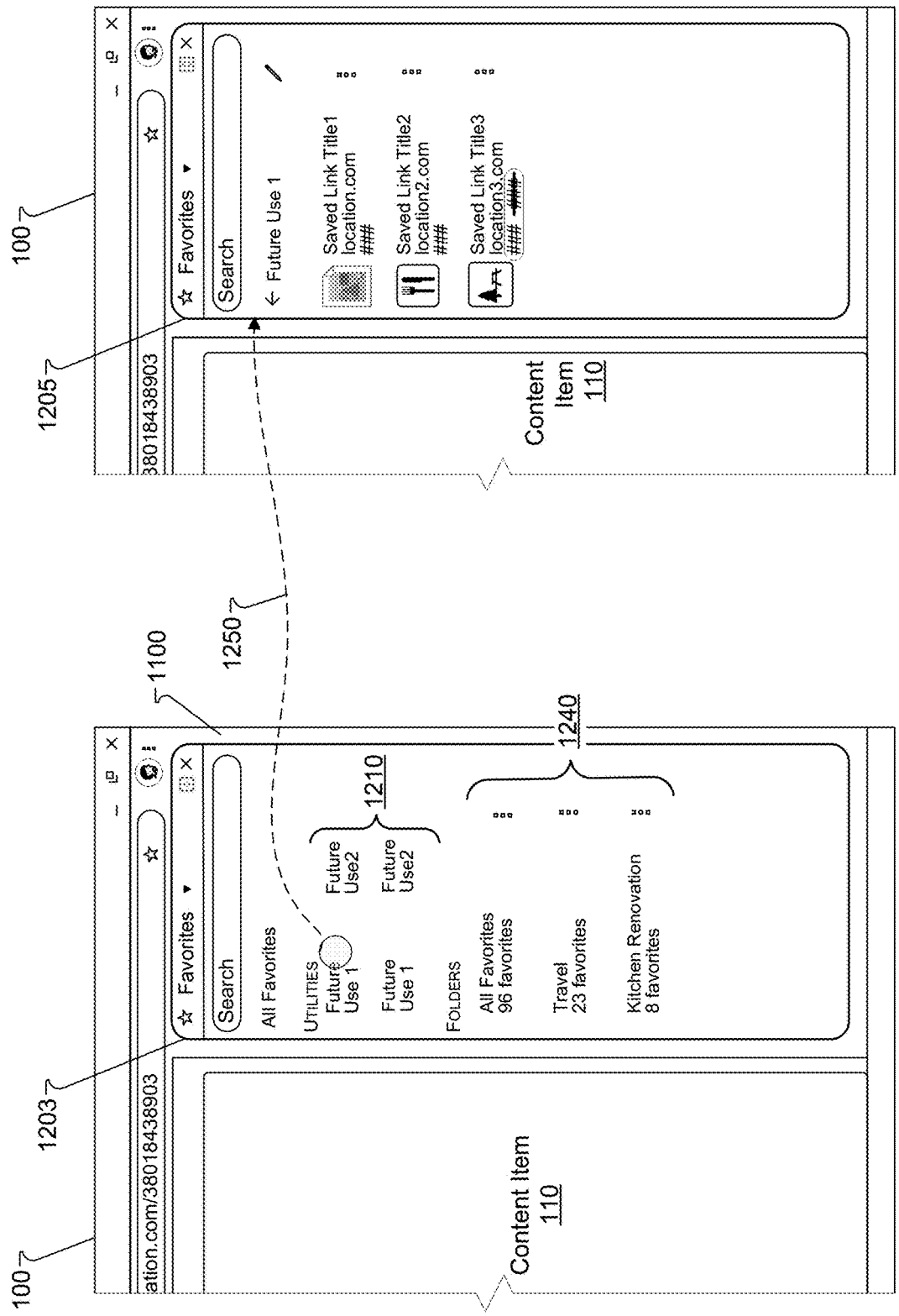
FIG. 12A illustrates an example browser application with an intent tracker interface, according to an aspect.

FIG. 12A illustrates an example browser UI 100 with an intent tracker interface 1205, according to an aspect. Like FIG. 11A, FIG. 12A illustrates the intent tracker interface 1205 in a sidebar area 1100. In the example of FIG. 12A, a saved resource user interface 1203 may be an initial user interface displayed in response to an indication that the user wants to view/manage saved resources. The saved resource user interface 1203 may include the list selection area 1210 as a navigation area displayed above a folder-based navigation area 1240 for saved resources without an associated future use intent tag, i.e., lacking an associated future use intent tag. The list selection area 1210 operates in a similar manner to list selection area 1110, enabling the user to navigate to the intent tracker interface 1205. Thus, selection of Future Use 1 (e.g., illustrated by selection 1250) causes the browser application to render (generate, display) intent tracker interface 1205 for saved resources associated with an intent tag for Future Use 1. As with FIG. 11A, Future Use 1 can be a future use intent supported by the browser application. The intent tracker interface 1205 includes data elements similar to those discussed above with regard to intent tracker interface 1105 of FIG. 11A. In other words, the intent tracker interface 1205 differs from intent tracker interface 1105 in layout and how it is triggered (surfaced), but has similar functionality to intent tracker interface 1105.

Figure 12B:
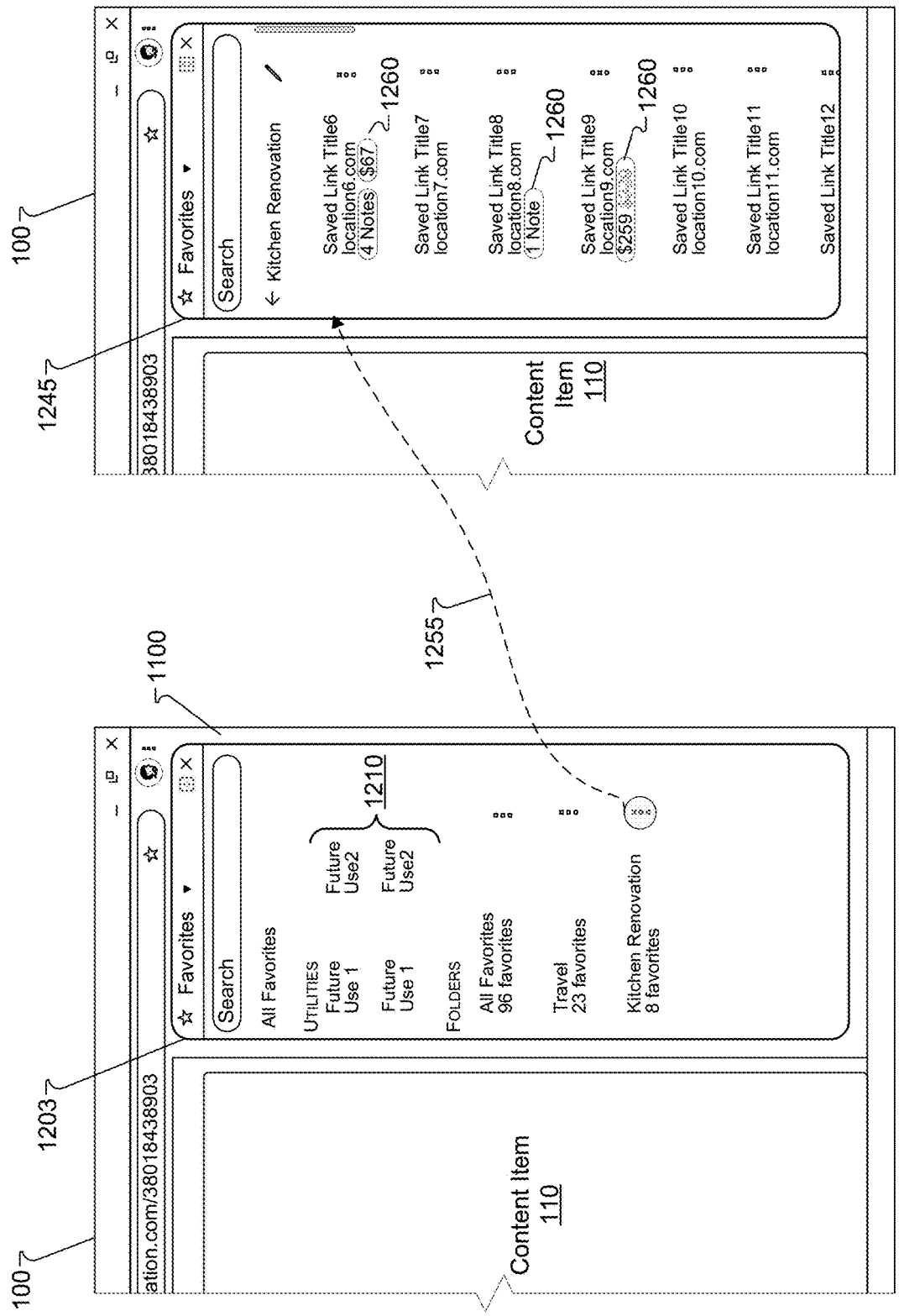
FIG. 12B illustrates an example browser application with a saved resources interface that incorporates indications for a particular future use intent tag, according to an aspect.

FIG. 12B illustrates an example browser UI 100 with a saved resources interface 1245 that incorporates indications for a particular future use intent tag, according to an aspect. FIG. 12B illustrates an implementation where an indication of one or more types of future use intents are displayed in a list of saved resources. In the example of FIG. 12B, instead of selecting Future Use 1 as in FIG. 12A, the user has selected a kitchen renovation folder in the folder-based navigation area 1240. The kitchen renovation folder contains 8 saved resources. Selection of the kitchen renovation folder, illustrated by selection 1255, causes the browser application to render (generate, display) saved resources interface 1245 for saved resources associated with the kitchen renovation folder. In the example of FIG. 12B, the browser application may display an indication 1260 of a particular type of future use intent when the saved resource is associated with a future use intent tag of that type. In the example of FIG. 12B, the type of future use intent includes two note intents and two attribute tracking intents. In the example of FIG. 12B one saved resource has a note intent and an attribute tracking intent. Rather than displaying the note associated with this future use intent tag, the interface 1245 includes an indication 1260 of the number of different notes associated with the saved resource. The indication of a future use intent can include an icon or image. The indication of a future use intent can include text. The indication of a future use intent can include a combination of text and an icon/image. Text included in an indication of a future use intent can reflect attributes of the future use intent tag (e.g., the number of notes, an initial value, a changed/updated value, a time, etc.).

Figure 13:
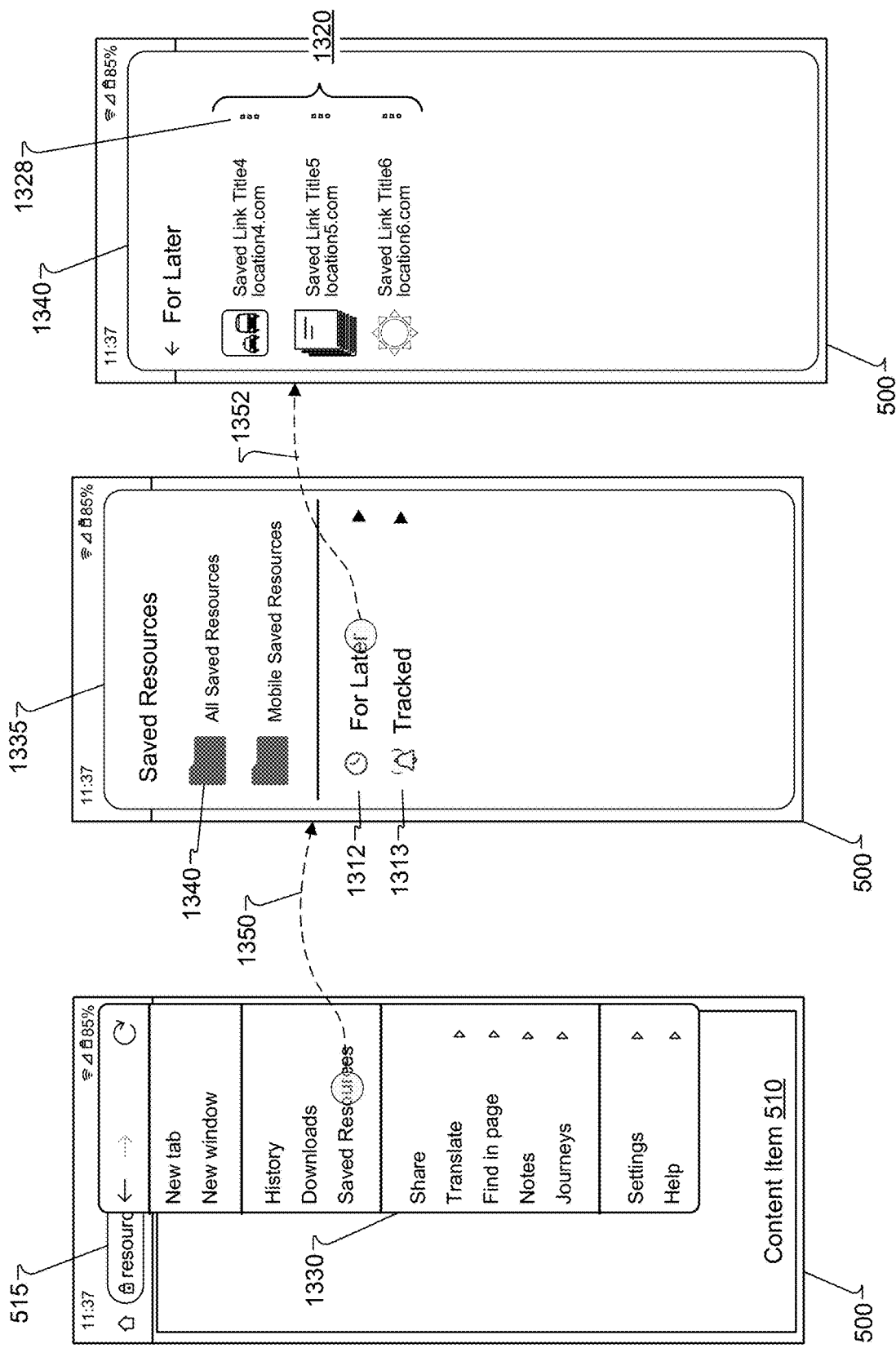
FIG. 13 illustrates an example browser application with an intent tracker interface, according to an aspect.

FIG. 13 illustrates an example browser user interface 500 with an intent tracker interface 1340, according to an aspect. The UI 500 illustrated in FIG. 13 is similar to the UI 500 illustrated in FIG. 5. In the example of FIG. 13, the user has selected the utility menu control 522, which results in the presentation of utility menu 1330. The utility menu 1330 includes several utility menu options, including the saved resources option. In the example of FIG. 13, the user has selected (e.g., illustrated by selection 1350), the saved resources option, which results in the presentation (display) of saved resource user interface 1335. The saved resource user interface 1335, like saved resource user interface 1203, may be an initial user interface displayed in response to an indication that the user wants to view/manage saved resources, such as selection 1350. In the example of FIG. 13, the saved resource user interface 1335 includes a read later intent option 1312 and an attribute tracking intent option 1313. The browser application may be configured to include the read later intent option 1312 and attribute tracking intent option 1313 in the saved resource user interface 1335 responsive to determining that at least one saved resource is associated with an attribute tracking intent tag and at least one saved resource is associated with a read later intent tag.

Selection of the read later intent option 1312 (represented by selection 1352) may cause the browser application to display intent tracker interface 1340. The intent tracker interface 1340, like may include a list of saved resources 1320. The information displayed by the intent tracker interface 1340 is similar to that displayed in intent tracker interface 1205 and intent tracker interface 1105. The intent tracker interface 1340 can also include additional user interface elements, such as options menu control 1328, which operates in a manner similar to options menu control 1128 as described in FIG. 11A.

FIG. 14 illustrates a system 1400 for providing future-use intents for saved resources in a browser application, according to an aspect. The system 1400 includes a computing system 1402. The computing system 1402 The computing system 1402 may also be referred to as a client computing device or a client device. The computing system 1402 is a device having an operating system 1410. In some examples, the computing system 1402 includes a personal computer, a mobile phone, a tablet, a netbook, a laptop, a smart appliance (e.g., a smart television), or a wearable. The computing system 1402 can be any computing device with input devices(s) 1430, such as a mouse, trackpad, touchscreen, keyboard, virtual keyboard, camera, etc. The computing system 1402 can include output device(s) 1424, such as a display (monitor, touchscreen, etc.) that enables a user to view and select displayed content. The computing system 1402 may include one or more processors, such as CPU/GPU 1432, formed in a substrate configured to execute one or more machine executable instructions or pieces of software, firmware, or a combination thereof. The processors, such as CPU/GPU 1432, can be semiconductor-based—that is, the processors can include semiconductor material that can perform digital logic. The computing system 1402 may include one or more memory devices 1404. The memory devices 1404 may include a main memory that stores information in a format that can be read and/or executed by the CPU/GPU 1432. The memory devices 1404 may store applications or modules (e.g., operating system 1410, applications 1412, browser application 1418, etc.) that, when executed by the CPU/GPU 1432, perform certain operations.

The operating system 1410 is a system software that manages computer hardware, software resources, and provides common services for computing programs. In some examples, the operating system 1410 is operable to run on a personal computer such as a laptop, netbook, or a desktop computer. In some examples, the operating system 1410 is operable to run a mobile computer such as a smartphone or tablet. The operating system 1410 may include a plurality of modules configured to provide the common services and manage the resources of the computing system 1402. The computing system 1402 may include one or more input devices 1430 that enable a user to select content. Non-exclusive example input devices 1430 include a keyboard, a mouse, a touch-sensitive display, a trackpad, a trackball, and the like. The computing system 1402 may include one or more output devices 1424 that enable a user to view a webpage and/or receive audio or other visual output.

The computing system 1402 may include applications 1412, which represent specially programmed software configured to perform different functions. One of the applications may be the browser application 1418. The browser application 1418 may be configured to display webpages, execute web applications, and the like. The browser application 1418 may include additional functionality in the form of extensions. In some implementations, the browser application 1418 may also be the operating system 1410 of the computing system 1402, e.g., similar to the CHROME OS. The browser application 1418 is an example of the browser application that generates the UI 100 of FIG. 1 and the UI 500 of FIG. 5. The browser application 1418 may include local saved resource storage 1426. The local saved resource storage 1426 may be a data store where saved resources (bookmarks, favorites, internet shortcuts, etc.) are stored. The local saved resource storage 1426 can thus also store saved resources that are associated with future use intent tags, or future use intents. In some implementations, a user may opt to synchronize saved resources with a user profile. In such implementations, the use may have a user account 1460 on a server computing system 1450 and periodically the local saved resource storage 1426 may be sent to the server computing system 1450 so that the synchronized saved resource storage 1466 can be updated with the user's local saved resource storage 1426. The user has control over the synchronization process.

Put another way, a user may be provided with controls allowing the user to make an election as to both if and when the saved resources, including the future use intents and any attributes/metadata associated with a future use intent, are saved in the local saved resource storage 1466, and if, when, and how much of the information stored in the local saved resource storage 1466 is synchronized with the user's profile, e.g., shared with the server computing system 1450. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The browser application 1418 may include intent detection model(s) 1422. Intent detection model(s) 1422 include machine-learned and/or rule-based models trained/configured to analyze a content item (webpage, document, etc.) and provide a prediction about whether a particular future use intent is applicable to (appropriate for) the content item. Put another way, the intent detection models(s) 1422 enable the browser application 1418 to provide data-driven user interface elements (intent controls) that provide a shortcut for adding a content item to an intent tracker. These shortcut controls can be proactively provided where the intent(s) are applicable. The intent detection model(s) 1422 can include a model for one or more of the future use intents supported by the browser application 1418.

In one example, the intent detection model 1422 can include a tracking intent model. A tracking intent model may be trained (e.g., via supervised training or semi-supervised training) to identify an entity in the content item that is associated with a numerical attribute that can change over time. Examples of entities with a numerical attribute that can change over time include items for sale or rent, stocks, locations with a predicted temperature, a quantity of an item in inventory, an expected arrival time for an entity, an expected delivery time for an entity, etc. In some implementations, the tracking intent model may be configured to provide a probability (e.g., a measure of confidence) for the content item, the probability indicating a level of confidence that the content item includes a particular entity with a numerical attribute for tracking. The model may also provide an entity identifier for the prediction, an identification of the numerical attribute to be tracked, and an initial value for the attribute. Thus, a prediction from the tracking intent model may include four data items; the entity identifier (which can be a description, name, numerical identifier, etc.), an attribute identifier (which can be a description, name, or numerical identifier, etc.), an attribute value (the initial value) and a tag (number) used to determine whether there is sufficient confidence in the other three data fields. In some implementations, the tracking intent model may not provide the entity identifier, attribute identifier, and the initial value if the confidence (the probability) fails to meet a confidence threshold. Thus, in some implementations, the confidence can be implied (e.g., that it meets a minimum confidence threshold) when the tracking intent model provides an entity identifier, an attribute identifier, and an initial value. In some implementations, the tracking intent model may be configured to provide a prediction for multiple entities, where a content item includes several potential entities appropriate for tracking. In some implementations, the tracking intent model may be configured to provide an entity identifier for an entity with the highest confidence.

In one example, the intent detection model 1422 can include a reminder intent model. The reminder intent model may be trained (e.g., via supervised training or semi-supervised training) to identify an entity in the content item that is associated with a future time. As used herein, a future time can be a date without a specified time or a date with a specified time. The future time can be identified in the content item itself. The future time can be inferred, e.g., such as an entity that accepts reservations or sells tickets to a future event (such as a restaurant, hotel, an entertainment production, etc.). The reminder intent model may be configured to provide a probability indicating a level of confidence that the content item includes a future time. In some implementations, the reminder intent model can provide a title or description for the future time. In some implementations, the reminder intent model may include a suggested reminder time. In some implementations, the reminder intent model may include multiple suggested reminder times.

In one example, the intent detection model 1422 can include a read later intent model. The read later intent model may be trained (e.g., via supervised training or semi-supervised training) or may be a rules-based model. The read later intent model may provide a probability that the content item includes an article format. An article format may include content that is mostly text, e.g., in the form of paragraphs. An article format may also include images. The article format may have a minimum ratio of images to text, e.g., more than 50% text. The article format may exclude content from embedded URLs (such as ads) from the analysis. The read later intent model may use document model objects or accessibility objects to determine whether the content item is majority text. The read later intent model may be configured to provide a probability indicating a level of confidence that the content item includes a majority of text. In some implementations, the read later intent model may analyze a main object of the content item (e.g., the main document object) to determine whether that main object is text based. The main object is an object that has a largest bounding box in the object model/accessibility model).

The browser application 1418 can also include or be associated with a local saved resource storage 1426. The local saved resource storage 1426 is a data store where saved resources (bookmarks, favorites, shortcuts, etc.) are stored. Each entry in the local saved resource storage 1426 represents a content item, e.g., a webpage or document. The content item can be accessible via a network 1440 from a service(s)/website(s) 1470. In some implementations, the content item can be stored locally, e.g., in memory devices 1404. Each entry in the local saved resource storage 1426 can have a content identifier. The content identifier uniquely identifies the content item. The content identifier can be a resource identifier, such as a URI or URL. The content identifier can also be a unique identifier for a non-Internet domain. The entry may also include a title or description for the saved resource. The entry may include an add or creation time. The add (creation) time represents the time at which the saved resource was added to the local saved resource storage 1426. The entry may include an expiration time. The expiration time may be calculated from the creation time. The expiration time may be a predetermined number of days from the creation time. The expiration time may be set by a user. The predetermined number of days may be set by a user. The entry of a saved resource in the local saved resource storage 1426 may be associated with one or more future use intent tags. A future use intent tag indicates that the saved resource is tracked on an intent tracker. In some implementations, a saved resources associated with a future use intent tag may not be tracked on a conventional saved resource list. In some implementations, a future use intent tag may be part of the entry of the saved resource. In some implementations, a future use intent tag may be saved in a separate record (e.g., a future use record) that is keyed by resource identifier. In such an implementation, a future use intent tag could be associated with two saved resource entries where the two saved resources have the same resource identifier, but may have different titles and/or be organized in a different location. The resource identifier may be an identifier of a tab group. When the resource identifier is a tab group, the future use intent tag is associated with each resource included in the tab group.

A future use intent tag may also be associated with additional data elements (attributes, metadata). These additional elements can be part of the saved resource entry or can be included in a future use record. An additional data element can include expiration information. The expiration information may be used to automatically delete or expire the association between the future use intent tag and the resource identifier. The expiration information may be a date at which the association expires. The expiration information may include an expiration period, the expiration period being counted from a date the future use intent tag was added to the saved resource. The additional data elements can provide additional functionality for the future use intent. For example, the attribute tracking intent may include an initial value. The attribute tracking intent may also include an entity identifier and an attribute identifier in addition to the initial value. As another example, a note intent may include text or an image selected by/provided by a user. As another example, a reminder intent may include a future time. The future time may represent a date or a date and time. As another example, the attribute tracking intent may include text extracted from the content item. The text extracted from the content item can be any text that gives context to the reminder. The text extracted from the content item may be a title. The text extracted from the content item may be text describing the future time. The text extracted from the content item may be text describing a main entity of the content item. Other future use intents may include similar data elements that enable the browser application 1418 to act on an intent. In other words, the browser application 1418 may use the additional data elements to perform some action programmatically, i.e., initiating the action without the user initiating the action. Put another way, the action for a future use intent is performed automatically, without user interaction. Such actions are discussed in more detail with regard to FIG. 18.

In some implementations, the local saved resource storage 1426 may be associated with a user profile. In other words, more than one user may have access to the computing system 1402 and may use the browser application 1418. In such scenarios, the local saved resource storage 1426 may be associated with a user profile, so that each user of the browser application 1418 may have a separate respective local saved resource storage 1426. In some implementations, the user may opt for saved resource synchronization. Saved resource synchronization may be initiated by the user on the computing system 1402. After initiating saved resource synchronization on the computing system 1402, the local saved resource storage 1426 may be shared with a user account 1460 for the user on server computing system 1450.

In some examples, the computing system 1402 may communicate with a server computing system 1450 over a network 1440. The server computing system 1450 may be a computing device or computing devices that take the form of a number of different devices, for example a standard server, a group of such servers, or a rack server system. In some examples, the server computing system 1450 may be a single system sharing components such as processors and memories. The network 1440 may include the Internet and/or other types of data networks, such as a local area network (LAN), a wide area network (WAN), a cellular network, satellite network, or other types of data networks. The network 1440 may also include any number of computing devices (e.g., computer, servers, routers, network switches, etc.) that are configured to receive and/or transmit data within network 1440. Network 1440 may further include any number of hardwired and/or wireless connections.

The server computing system 1450 may include one or more processors 1452 formed in a substrate, an operating system (not shown) and one or more memory devices 1454. The memory devices 1454 may represent any kind of (or multiple kinds of) memory (e.g., RAM, flash, cache, disk, tape, etc.). In some examples (not shown), the memory devices 1454 may include external storage, e.g., memory physically remote from but accessible by the server computing system 1450. The server computing system 1450 may include one or more modules or engines representing specially programmed software. For example, the server computing system 1450 may include systems for managing and accessing user account(s) 1460. The user accounts 1460 may include data that a user has requested to be synchronized across devices, such as computing system 1402. The synchronized data can include session data 1462. The session data 1462 can enable a user to resume browsing activity after switching devices. The user account 1460 may also include profile data 1464. The profile data 1464 may include, with user consent, information describing the user. The profile data 1464 may also include data that identifies a user (e.g., a username and password). The user account 1460 may also include synchronized saved resource storage 1466. The saved resource storage 1466 may be a data store of saved resources for the user across devices. For example, as part of a synchronization activity the local saved resource storage 1426 may be sent from the computing system 1402 to the server computing system 1450 and saved in saved resource storage 1466.

Figure 15:
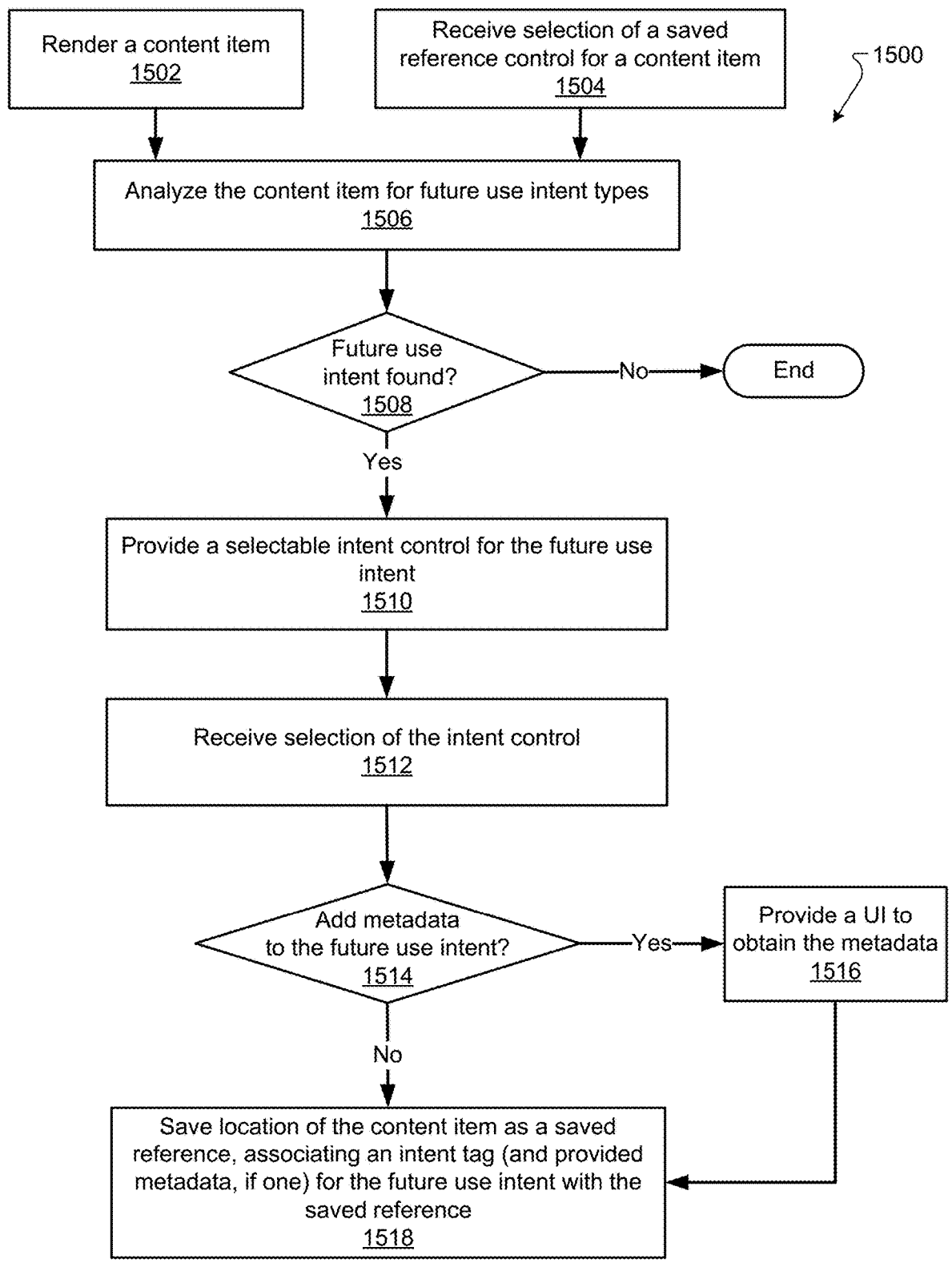
FIG. 15 is a flowchart depicting an example process for obtaining future-use intents in a browser application, according to an aspect.

FIG. 15 is a flowchart depicting an example process 1500 for obtaining future-use intents in a browser application, according to an aspect. The process 1500 may be performed by a browser application, such as browser application 1418 of FIG. 14. The process 1500 may suggest future use intents appropriate for, or applicable to, the content that the user is currently viewing in a browser interface. The suggestions may thus be referred to as intelligent suggestions. Put another way, in the process 1500 may provide one or more intent controls only when the content is determined to be applicable for the future use intent. Such intelligent, proactive suggestions make future use intent associations more accurate and reduce user input.

Process 1500 may have two entry points. In some implementations, process 1500 may begin when a content item is rendered by the browser application (1502). In such implementations, the browser application may be configured to proactively suggest appropriate intents. Such a proactive suggestion is illustrated by FIGS. 2 and 3, but can also be illustrated by FIGS. 4B, and 6-8. In some implementations, process 1500 may begin in response to receipt of a user's selection of a saved resource control (1504), such as selection of saved resource control 150, saved resource control 650, saved resource control 750, or saved resource control 850.

The browser application may then analyze the content item for future use intent types (1506). The analysis can be performed in whole or in part by machine-learned models. The models can be trained to recognize the formatting and information expected in a content item for particular types of intents, as discussed with regards to intent detection model(s) 1422. As discussed herein, two or more future use intents may be applicable to a content item. If the analysis indicates that no future use intents are applicable to the content item (1508, No), process 1500 may end. In other words, in some implementations, if no future use intents are applicable to the content item, the system may not suggest any intents. In some implementations (not shown) if no future use intents are determined to be applicable to the content item a default future use intent may be provided. This default future use intent may be applicable to any content item. In some implementations, a read later intent can be a default intent. In some implementations, a reminder intent may be a default intent.

If at least one future use intent is determined to be applicable for the content item (1508, Yes), the system may provide a selectable intent control for the future use intent (1510). The selectable intent control can be any UI element configured to perform the remaining steps of process 1500 in response to being selected, i.e., to associate a future use intent tag with the saved resource of the content item. Example selectable intent controls include (but is not limited to) links, buttons, toggles, selectable icons, etc. Example intent controls are illustrated in FIGS. 2, 3, 4A, 4B, 6, 7, and 8, although implementations are not limited to the example controls illustrated. In addition, although not illustrated, the system can also provide an intent control for a default intent type with the intent control for the future use intent type determined to be applicable to the content item.

In response to user selection of an intent control (1512) the system may determine whether the type of future use intent corresponding to the intent control has metadata to collect and, if so, whether to provide a user with an opportunity to provide the metadata (1514). Each future use intent type may have additional metadata to store with (or to represent) the future use intent tag. In some implementations, a future use intent type may have a corresponding object (i.e., a data structure) that determines the type of metadata collected. The metadata can also be referred to as attribute-value pairs (e.g., an attribute identified in the object and an associated value). A value for an attribute can be extracted from the content item by the system. An attribute value can be provided by a user. A default attribute value for an attribute can be extracted from the content item or otherwise provided by the system and a user may edit the default value. As an example, a reminder intent type may have a time attribute. The time attribute represents a future time. The future time is a time at which the user wants to be reminded about the content item. The future time can be extracted from the content item. For example, the content item may be associated with (include) a future time and the system may extract the future time from the content item and use that as the default attribute value for the future time. Identification of a future time in a content item can be done with pattern matching or a machine-learned model for identifying and extracting times (that occur in the future). In some implementations, a time extracted from the content item may be presented as one suggested attribute value in a user interface that enables a user to edit/modify/select another attribute value (e.g., in a user interface similar to FIG. 9).

Example content items with a future time include a content item relating to a future showtime for a movie or concert, a hotel or restaurant reservation content item, a homepage of a business that is opening soon, etc. As another example, an attribute tracking intent type may have an initial value attribute. In some implementations, the attribute tracking intent type may also have an attribute name attribute. For example, the attribute name value may indicate what attribute is being tracked (e.g., price, score, temperature, inventory, etc.) and the initial value may be a number representing the value for that attribute at the time the future use intent was added to the saved resources. As with the time attribute, an initial value attribute may be extracted from the content item (e.g., using pattern matching and/or a machine learned model). As used herein, an attribute can refer to a name of the attribute and/or its value, depending on the context. For example, a user adding or editing an attribute is understood to be the user adding or editing a value for the attribute, whereas a user interface displaying the attribute may display the attribute name (identifier) and the value. These attribute-value pairs can also be referred to generally as metadata.

If a user is to be given the opportunity to add or edit metadata (or attribute-value pairs) for the intent type corresponding to the selected intent control (1514, Yes), the system provides a user interface to obtain the user's input (1516). FIG. 9 illustrates one example of a user interface for obtaining the metadata from the user. Implementations can include other similar interfaces, e.g., that enable a user to edit the numerical attribute to be tracked and/or provide an initial value for the attribute to be tracked. Step 1516 is optional.

In response to the selection of the intent control, the system saves the location of the content item in a saved resource datastore, associating an intent tag with the saved resource (1518). As discussed with regard to FIG. 14, this may include generating a separate record (e.g., a future use record keyed by resource identifier). The intent tag corresponds to the future use intent type of the intent control. The system may also associate any metadata with the intent tag. The metadata can include default attribute-value pairs, attribute values extracted from the content item, and/or attribute values provided/edited by the user. The association of the future use intent tag may differentiate the saved resource from saved resources (bookmarks) that lack association with a future use intent tag. In some implementations, saved resources associated with a future use intent tag may not be listed with saved resources that lack association with a future use intent tag but may be accessible using intent trackers. In some implementations, the existence of one or more future use intent tags may be noted (e.g., by an indication of the future use) in a listing of saved resources. In some implementations, an expiration date is associated with the future use intent tag. The expiration date is considered metadata of the future use intent. The expiration date can be used to clear out the future use intents automatically. In some implementations, the expiration date may be set by the system. In some implementations, the user may be given an opportunity to edit the expiration date (e.g., via a user interface surfaced by options menu control 1128 of FIG. 11A). In some implementations, the user may set a default expiration date used by the system. For example, the user may set a default expiration date of two weeks, a month, six months, etc. As explained with regard to FIG. 18, these dates can help keep the intent trackers fresh. Process 1500 then ends but can be repeated each time the browser loads a new content item.

Figure 16:
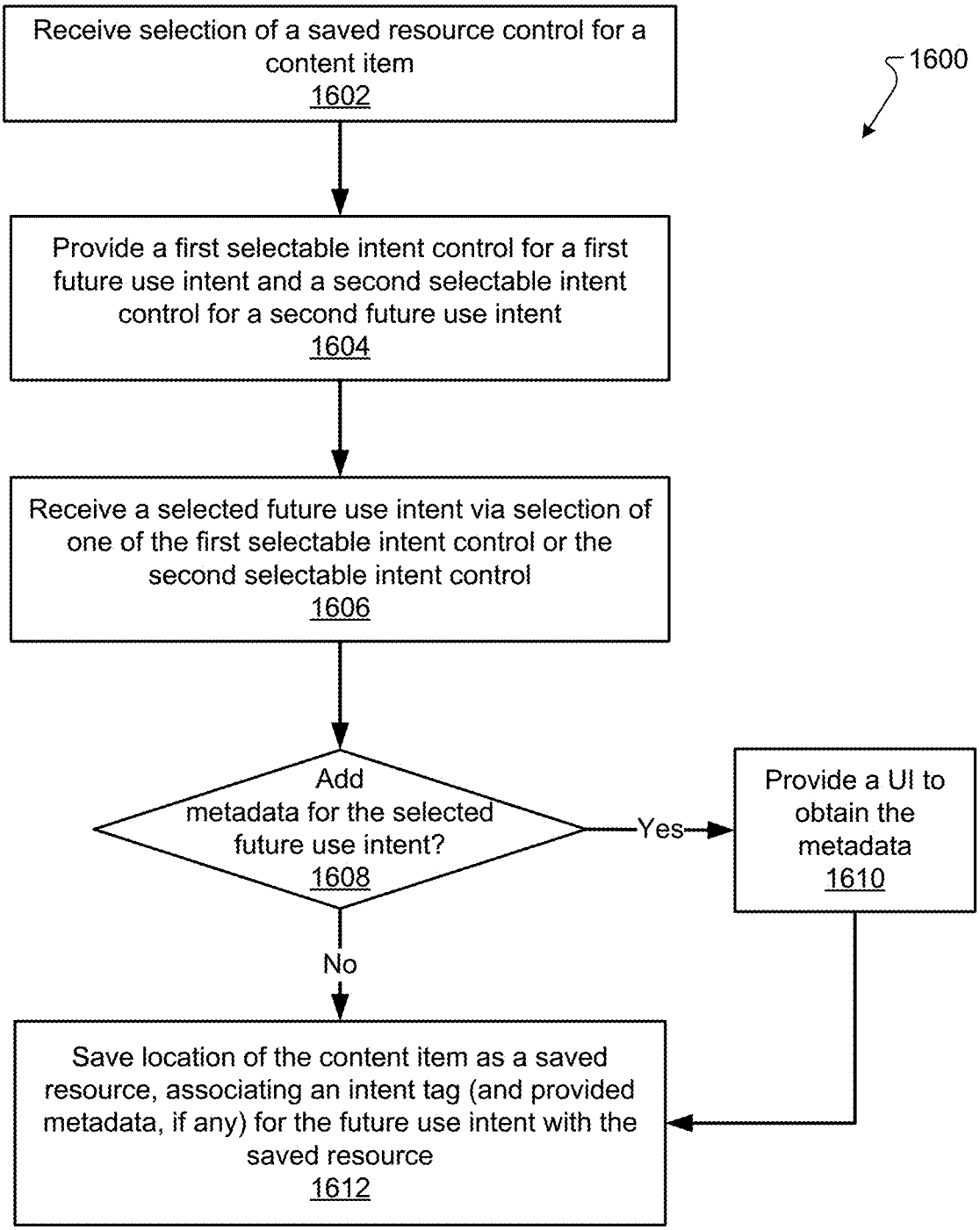
FIG. 16 is a flowchart depicting an example process for obtaining future-use intents in a browser application, according to an aspect.

FIG. 16 is a flowchart depicting an example process 1600 for obtaining future-use intents in a browser application, according to an aspect. The process 1600 may be performed by a browser application, such as browser application 1418 of FIG. 14. The process 1600 may provide a user interface for adding any kind of future use intent to a content item. Thus, process 1600 is similar to process 1500 but does not rely on an analysis of the content item. Instead, process 1600 provides intent controls that can be applied to the saved resource for any content item.

Process 1600 may begin in response to receiving selection of a saved resource control for a content item (1602). A saved resource control is a control that is configured to, upon selection, to add the location (e.g., resource identifier, URL, URI, etc.) of the content item to a saved resource storage area, e.g., local saved resource storage 1426 of FIG. 14. The saved resources can be referred to as bookmarks, favorites, internet shortcuts, and the like. In addition to a user interface conventionally provided in response to selection of the saved resource control, the system may also provide respective selectable intent controls for the types of future use intents supported by the browser application. For example, the system may provide a first selectable intent control for a first future use intent type and a second selectable intent control for a second future use intent type (1604). The respective selectable intent controls can be any UI element configured to perform the remaining steps of process 1600 in response to being selected, i.e., to associate a future use intent tag with the saved resource of the content item. Example selectable intent controls include (but is not limited to) links, buttons, toggles, selectable icons, etc. Example intent controls are illustrated in FIGS. 2, 3, 4A, 4B, 6, 7, and 8, although implementations are not limited to the example controls illustrated.

In response to user selection of an intent control, e.g., selection of either the first intent control or the second intent control, the system receives a selected future use intent (1606). The system may determine whether the type of the selected future use intent has metadata and, if so, whether to provide a user with an opportunity to provide the metadata (1608). Each future use intent type may have metadata associated with it, e.g., represented as one or more attribute-value pairs. A value for an attribute can be extracted from the content item by the system. An attribute value can be provided by a user. A default attribute value for an attribute can be extracted from the content item or otherwise provided by the system and a user may edit the default value. Because the future use intents are not necessarily determined to be appropriate for the content type, in some implementations the system may try to extract a value for the attribute, but may provide the user interface for obtaining the attribute (1610) if one cannot be located. If a user is to be given the opportunity to add or edit the metadata for the intent type corresponding to the selected intent control (1608, Yes), the system provides a user interface to obtain the user's input (1610). FIG. 9 illustrates one example of a user interface for obtaining the metadata from the user. Implementations can include other similar interfaces, e.g., that enable a user to edit the attribute to be tracked and/or provide an initial value for the numerical attribute to be tracked. Steps 1608 and 1610 can be optional.

In response to the selection of the intent control, the system saves the location of the content item in a saved resource datastore, associating an intent tag with the saved resource (1612), e.g., as described with regard to FIG. 14. The intent tag corresponds to the future use intent type of the intent control. The system may also associate any metadata with the intent tag. The metadata may be default metadata, metadata extracted from the content item, and/or metadata provided/edited by the user. The association of the future use intent tag differentiates the saved resource from conventional saved resources (bookmarks). As described herein, such saved resources may not be listed with conventional saved resources but may be accessible using intent trackers. Also as described herein, such saved resources may be listed with conventional saved resources but include an indication that the future use intent exists, as illustrated in the examples of FIGS. 11B and 12B. As explained above with regard to FIG. 15, the system may also associate an expiration date with the saved resource. Process 1600 then ends but can be repeated each time the selection of a saved resource control is received.

Figure 17:
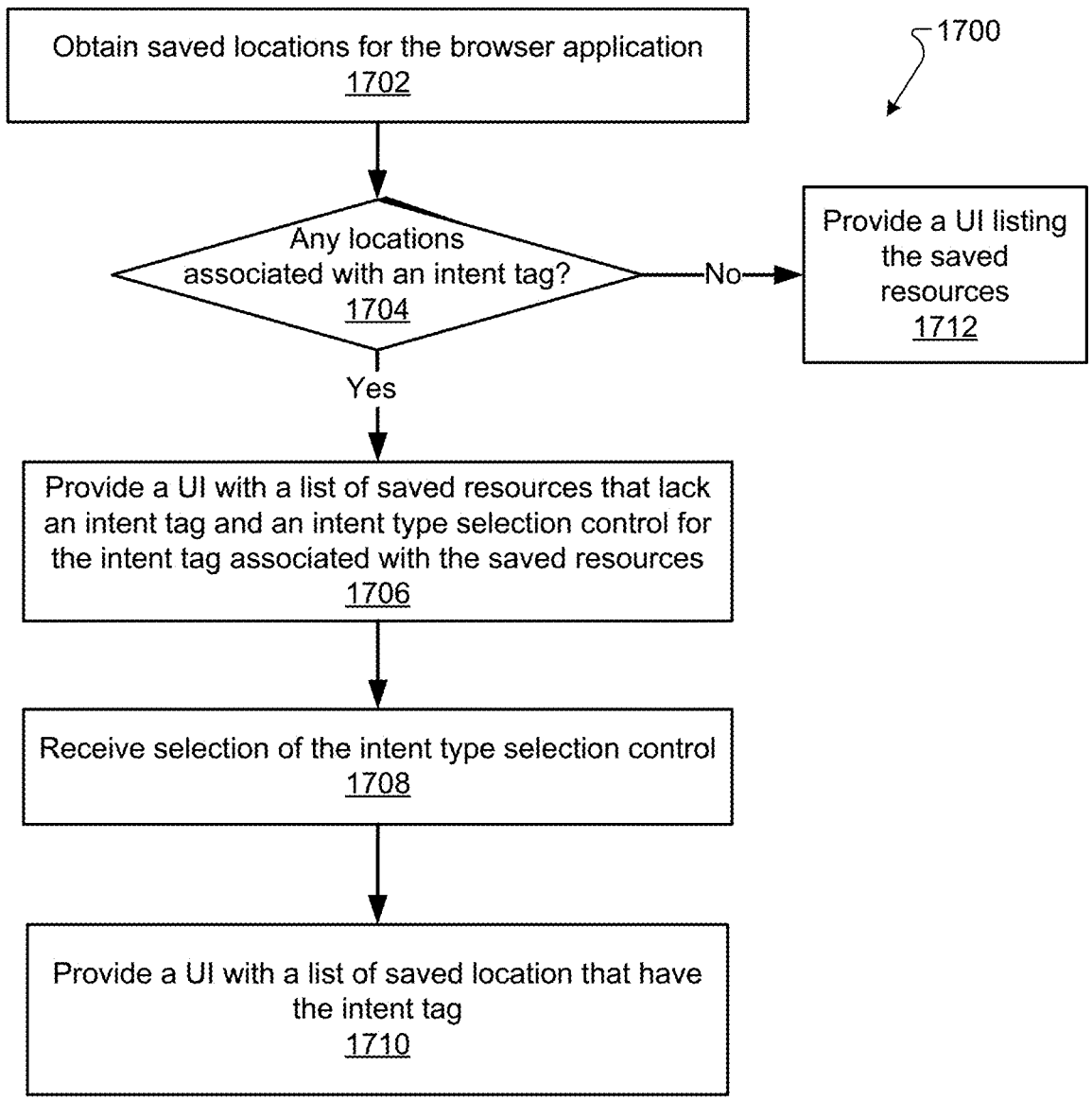
FIG. 17 is a flowchart depicting an example process for displaying an intent tracker in a browser application, according to an aspect.

FIG. 17 is a flowchart depicting an example process 1700 for displaying an intent tracker in a browser application, according to an aspect. Process 1700 may be performed by a browser application, such as browser application 1418 of FIG. 14. The process 1700 may provide an improved saved resource user interface that includes an intent tracker. The intent tracker lists saved resources associated with future use intents, i.e., saved resources associated with a future use intent tag. Intent trackers help a user organize and use saved resources for specific future use intents. Process 1700 may be performed in response to a user requesting a selected location list, e.g., in response to selection 1350 or selection of a saved resource option after selecting utility menu control 122. FIGS. 11A and 12A illustrate user interfaces provided by process 1700, or portions of process 1700.

Process 1700 may begin by obtaining saved resources (1702). The saved resources can be stored on the device, e.g., as local saved resource storage 1426 of FIG. 14. The saved resources can be obtained from a remote device, e.g., from saved resource storage 1466 of FIG. 14. The system may determine whether the saved resources obtained include saved resources associated with a future use intent tag (1704). If no saved resources are associated with a future use intent tag (1704, No), the system provides a conventional user interface listing the saved resources (1712) and process 1700 ends. If at least one saved resource is associated with a future use intent tag (1704, Yes), the system may provide a user interface that includes a list of saved resources that lack a future use intent tag and a respective intent type selection control for the intent types of the future use intent tags associated with saved resources (1706). The intent type selection control is configured to, when selected, cause the system to provide an intent tracker for the intent type. The invent tracker lists the saved resources that are associated with the intent tag corresponding to the type of intent of the control. The system may receive selection of the intent type selection control (1708) and provide a user interface that lists the saved resources that have the intent tag corresponding to that type of intent. Example intent trackers are illustrated in FIGS. 11A and 12A. The intent tracker interface may itself include intent type selection controls for other types of future use intents (e.g., performing steps 1708 and 1710 for another type of future use intent) and a control for the conventional saved resource interface (e.g., step 1706), or may include a back button (or other control) to take the user back to the list of saved resources that lack future use intent tags (1706). Process 1700 then ends.

Figure 18:
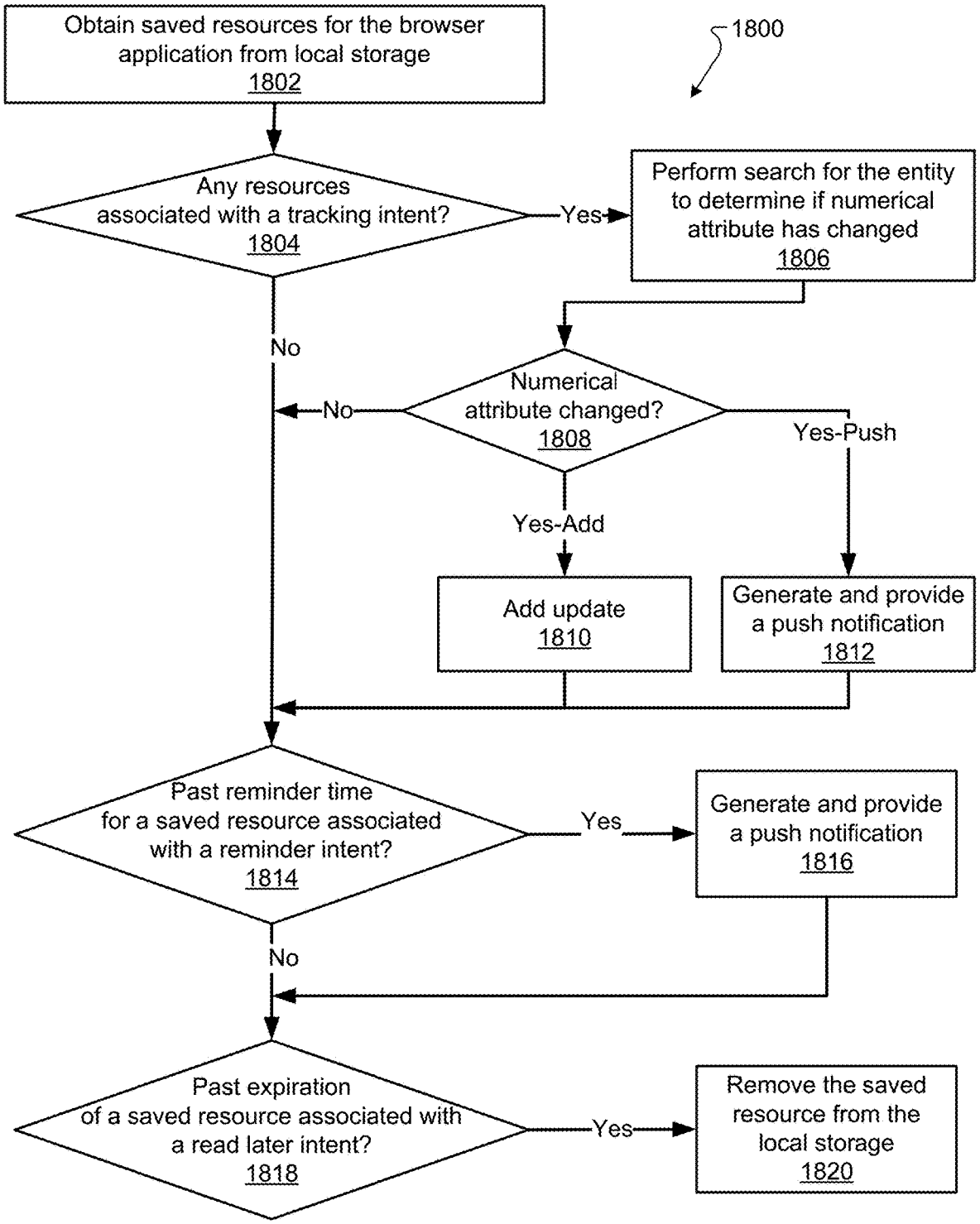
FIG. 18 is a flowchart depicting an example process for acting on future intents for saved resources with future use intents, according to an aspect.

FIG. 18 is a flowchart depicting an example process 1800 for acting on future intents for saved resources with future use intents, according to an aspect. Process 1800 may be performed by a browser application, such as browser application 1418 of FIG. 14. Process 1800 may be used to act on the future use intents. Put another way, process 1800 (or portions thereof) can represent execution of (a sequence of) actions taken as a result of association of a future use intent (e.g., intent tag) with a saved resource. This sequence of actions makes saved resources active, e.g., performing tasks on/with saved resources rather than waiting for a user to actively select and return to the saved resource. Process 1800 may be performed periodically, e.g., every hour, once a day, twice a day, every-other day, once a week, etc.

Process 1800 may begin by obtaining saved resources (1802). The saved resources can be stored on the device, e.g., as local saved resource storage 1426 of FIG. 14. The saved resources can be obtained from a remote device, e.g., from saved resource storage 1466 of FIG. 14. The system may determine whether the saved resources obtained include saved resources associated with an attribute tracking intent tag (1804). If so (1804, Yes), the system may perform a search for the entity associated with the tracking intent tag to determine if the initial value of the numerical attribute being tracked has changed (1806). The search may be performed by submitting the entity as a query to a general search engine. The search may be performed by submitting the entity as a query to a specialized search engine. Specialized search engines can include shopping search engines, weather prediction search engines, proprietary search engines (e.g., using a web application interface), etc. After receiving the search results for the search, the system may determine, from the results, whether the numerical attribute has changed (1808). If the numerical attribute has changed, the system may either generate and provide a push notification (1812) that the attribute has changed or may add the updated value to the intent tracker entry for that saved resource (1810). Steps 1806 to 1812 can be repeated for each saved resource associated with an attribute tracking intent.

Process 1800 can also include determining whether any saved resources associated with a reminder intent have a reminder time that is past due (1814). Put another way, if the current time is later than the reminder time (an attribute associated with reminder intent tags) (1814, Yes), the system may generate and provide a push notification to the user (1816). The push notification may be provided in a manner selected/set up by the user for reminder intent types.

Process 1800 can also include determining whether any of the saved resources associated with an intent tag have expired (1818). Determining whether the tag has expired is based on an expiration data element (expiration time) associated with the tag. The expiration data element can be an attribute of the future use intent tag. The expiration data element can be calculated from a "date added" attribute of the future use intent tag, e.g., adding a predetermined time to the date added attribute. This predetermined time can be fixed by the browser or can be set by the user, e.g., as a setting in the user profile data. If the current time is greater than the expiration data element (1818, Yes), the system may remove the saved resource from the local storage (1820). Process 1800 then ends.

In some implementations, the system may perform steps 1804 to 1810 as part of step 1710 of FIG. 17. For example, the updated value 1124 and outline 1123 of FIG. 11A may be provided as a result of performing steps 1804 to 1810.

Figure 19:
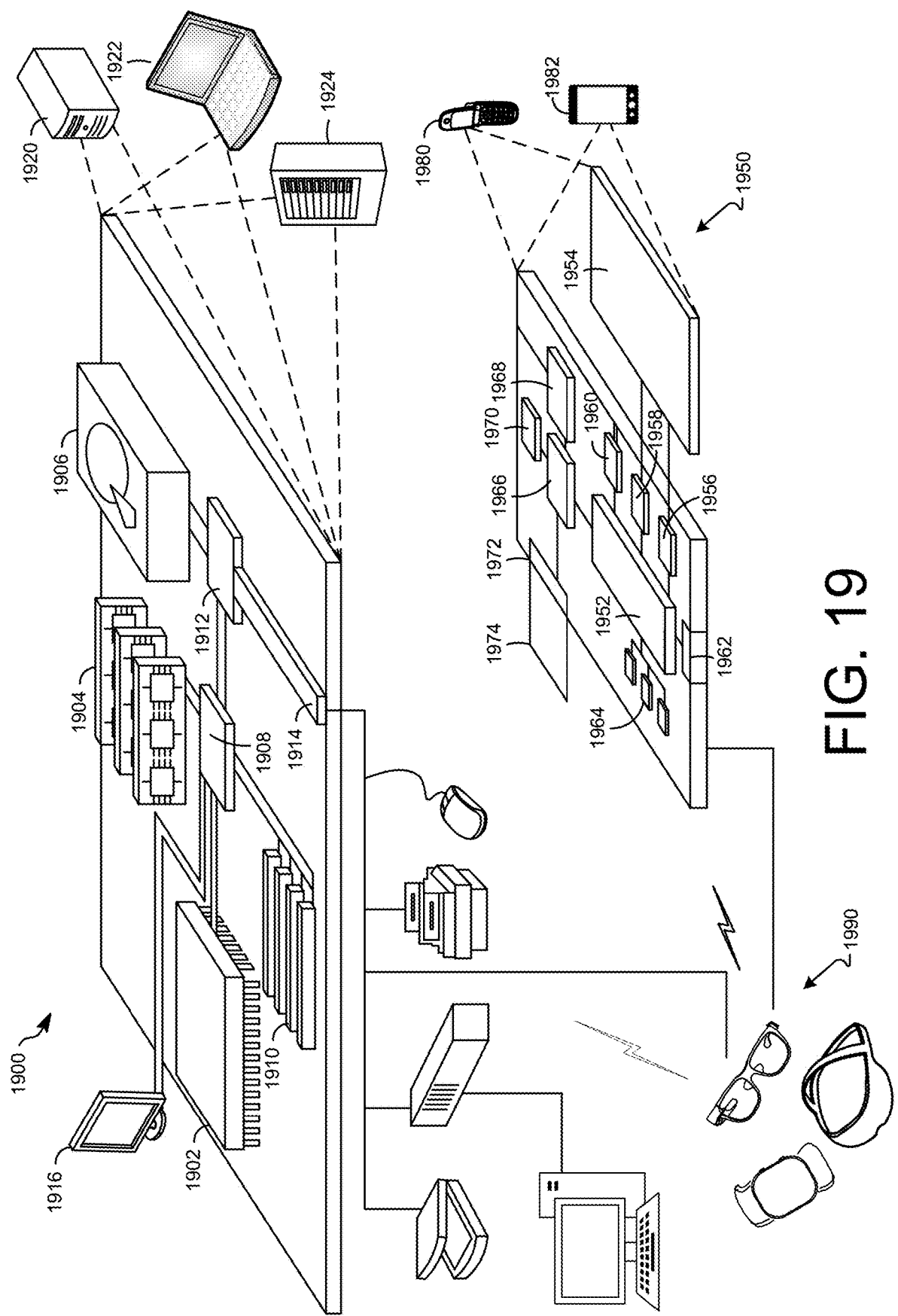
FIG. 19 shows an example of example computing devices according to an aspect.

FIG. 19 shows an example of example computing devices according to an aspect. In some implementations, the computer device 1900 is an example of the computing system 1402. In some implementations, the computer device 1900 is an example of the server computing system 1450. In some implementations, the mobile computer device 1950 is an example of the computing system 1402. Computing device 1900 is intended to represent various forms of digital computers, such as laptops, desktops, tablets, workstations, personal digital assistants, televisions, servers, blade servers, mainframes, and other appropriate computing devices. Computing device 1950 is intended to represent various forms of mobile devices, such as personal digital assistants, cellular telephones, smart phones, and other similar computing devices. The components shown here, their connections and relationships, and their functions, are meant to be an example only, and are not meant to limit implementations described and/or claimed in this document.

Computing device 1900 includes a processor 1902, memory 1904, a storage device 1906, a high-speed interface 1908 connecting to memory 1904 and high-speed expansion ports 1910, and a low-speed interface 1912 connecting to low-speed communication port 1914 and storage device 1906. The processor 1902 can be a semiconductor-based processor. The memory 1904 can be a semiconductor-based memory. Each of the components 1902, 1904, 1906, 1908, 1910, and 1912, are interconnected using various buses, and may be mounted on a common motherboard or in other manners as appropriate. The processor 1902 can process instructions for execution within the computing device 1900, including instructions stored in the memory 1904 or on the storage device 1906 to display graphical information for a GUI on an external input/output device, such as display 1916 coupled to high-speed interface 1908. In other implementations, multiple processors and/or multiple buses may be used, as appropriate, along with multiple memories and types of memory. Also, multiple computing devices 1900 may be connected, with each device providing portions of the necessary operations (e.g., as a server bank, a group of blade servers, or a multi-processor system).

The memory 1904 stores information within the computing device 1900. In one implementation, the memory 1904 is a volatile memory unit or units. In another implementation, the memory 1904 is a non-volatile memory unit or units. The memory 1904 may also be another form of computer-readable medium, such as a magnetic or optical disk.

The storage device 1906 is capable of providing mass storage for the computing device 1900. In one implementation, the storage device 1906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1904, the storage device 1906, or memory on processor 1902.

The high-speed interface 1908 manages bandwidth-intensive operations for the computing device 1900, while the low-speed interface 1912 manages lower bandwidth-intensive operations. Such an allocation of functions is an example only. In one implementation, the high-speed interface 1908 is coupled to memory 1904, display 1916 (e.g., through a graphics processor or accelerator), and to high-speed expansion ports 1910, which may accept various expansion cards (not shown). In the implementation, low-speed interface 1912 is coupled to storage device 1906 and low-speed communication port 1914. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 1900 may be implemented in a number of different forms, as shown in the figure. For example, it may be implemented as a standard server 1920, or multiple times in a group of such servers. It may also be implemented as part of a rack server system 1924. In addition, it may be implemented in a personal computer such as a laptop computer 1922. Alternatively, components from computing device 1900 may be combined with other components in a mobile device (not shown), such as device 1950. Each of such devices may contain one or more of computing devices 1900, 1950, and an entire system may be made up of multiple computing devices 1900, 1950 communicating with each other.

Computing device 1950 includes a processor 1952, memory 1964, an input/output device such as a display 1954, a communication interface 1966, and a transceiver 1968, among other components. The device 1950 may also be provided with a storage device, such as a microdrive or other device, to provide additional storage. Each of the components 1950, 1952, 1964, 1954, 1966, and 1968, are interconnected using various buses, and several of the components may be mounted on a common motherboard or in other manners as appropriate.

The processor 1952 can execute instructions within the computing device 1950, including instructions stored in the memory 1964. The processor may be implemented as a chipset of chips that include separate and multiple analog and digital processors. The processor may provide, for example, for coordination of the other components of the device 1950, such as control of user interfaces, applications run by device 1950, and wireless communication by device 1950.

Processor 1952 may communicate with a user through control interface 1958 and display interface 1956 coupled to a display 1954. The display 1954 may be, for example, a TFT LCD (Thin-Film-Transistor Liquid Crystal Display) or an OLED (Organic Light Emitting Diode) display, or other appropriate display technology. The display interface 1956 may comprise appropriate circuitry for driving the display 1954 to present graphical and other information to a user. The control interface 1958 may receive commands from a user and convert them for submission to the processor 1952. In addition, an external interface 1962 may be provided in communication with processor 1952, so as to enable near area communication of device 1950 with other devices. External interface 1962 may provide, for example, for wired communication in some implementations, or for wireless communication in other implementations, and multiple interfaces may also be used.

The memory 1964 stores information within the computing device 1950. The memory 1964 can be implemented as one or more of a computer-readable medium or media, a volatile memory unit or units, or a non-volatile memory unit or units. Expansion memory 1974 may also be provided and connected to device 1950 through expansion interface 1972, which may include, for example, a SIMM (Single In Line Memory Module) card interface. Such expansion memory 1974 may provide extra storage space for device 1950, or may also store applications or other information for device 1950. Specifically, expansion memory 1974 may include instructions to carry out or supplement the processes described above, and may include secure information also. Thus, for example, expansion memory 1974 may be provided as a security module for device 1950, and may be programmed with instructions that permit secure use of device 1950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1964, expansion memory 1974, or memory on processor 1952 that may be received, for example, over transceiver 1968 or external interface 1962.

Device 1950 may communicate wirelessly through communication interface 1966, which may include digital signal processing circuitry where necessary. Communication interface 1966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1968. In addition, short-range communication may occur, such as using a BLUETOOTH, Wi-Fi, or other such transceiver (not shown). In addition, GPS (Global Positioning System) receiver module 1970 may provide additional navigation- and location-related wireless data to device 1950, which may be used as appropriate by applications running on device 1950.

Device 1950 may also communicate audibly using audio codec 1960, which may receive spoken information from a user and convert it to usable digital information. Audio codec 1960 may likewise generate audible sound for a user, such as through a speaker, e.g., in a handset of device 1950. Such sound may include sound from voice telephone calls, may include recorded sound (e.g., voice messages, music files, etc.) and may also include sound generated by applications operating on device 1950.

The computing device 1950 may be implemented in a number of different forms, as shown in the figure. For example, it may be implemented as a cellular telephone 1980. It may also be implemented as part of a smart phone 1982, personal digital assistant, tablet, wearable 1990, or another similar mobile device.

In some implementations, the computing devices depicted in the figure can include sensors that interface with a wearable (e.g., AR headset/HMD) device 1990 to generate an augmented environment for viewing inserted content within the physical space. For example, one or more sensors included on a computing device 1950 or other computing device depicted in the figure, can provide input to the AR headset 1990 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1950 can use the sensors to determine an absolute position and/or a detected rotation of the computing device in the AR space that can then be used as input to the AR space. For example, the computing device 1950 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connected to, the computing device 1950 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1950 when the computing device is incorporated into the AR space can cause a particular action to occur in the AR space.

In some implementations, a touchscreen of the computing device 1950 can be rendered as a touchpad in AR space. A user can interact with the touchscreen of the computing device 1950. The interactions are rendered, in AR headset 1990 for example, as movements on the rendered touchpad in the AR space. The rendered movements can control virtual objects in the AR space.

In some implementations, one or more output devices included on the computing device 1950 can provide output and/or feedback to a user of the AR headset 1990 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Although certain example computer-implemented methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

In some aspects, the techniques described herein relate to a method performed by a browser application, the method including: determining that a type of future use intent is applicable to a content item displayed in the browser application; and in response to determining that the type of future use intent is applicable to the content item, providing an intent control configured to, in response to selection, add a resource identifier of the content item to a saved resources datastore with a tag that represents the type of future use intent. In some implementations, the determination is based on an intent-detection model.

In some aspects, the techniques described herein relate to a method, further including: receiving selection of a saved resource control; wherein analyzing the content item and determining whether the content item is associated with the type of future use intent is performed responsive to receiving the selection of the saved resource control.

In some aspects, the techniques described herein relate to a method, wherein the intent control for adding the resource identifier to the saved resources is included with a saved resource confirmation window.

In some aspects, the techniques described herein relate to a method, wherein the type of future use intent represents a type of action to be performed with respect to the content item.

In some aspects, the techniques described herein relate to a method, wherein providing the intent control includes adding a selectable icon to an address input area of the browser application.

In some aspects, the techniques described herein relate to a method, wherein providing the intent control further includes adding the selectable icon with a saved resource control in the address input area.

In some aspects, the techniques described herein relate to a method, wherein providing the intent control further includes adding a drop-down control to a saved resource control in an address input area, the drop-down control being selectable and, in response to being selected, provides access to the intent control.

In some aspects, the techniques described herein relate to a method, wherein analyzing the content item includes: determining that the content item relates to an entity associated with reservations; and responsive to determining that the content item relates to the entity, determining that the content item is associated with a reminder intent, the reminder intent being the type of future use intent.

In some aspects, the techniques described herein relate to a method, wherein the intent control includes a first option for selecting a time extracted from the content item, a second option for selecting a time later the current time, and a third option for receiving a user-entered time.

In some aspects, the techniques described herein relate to a method, wherein analyzing the content item includes: determining that the content item relates to an entity with a numerical attribute; and responsive to determining that the content item relates to the entity with the numerical attribute, determining that the content item is associated with an attribute tracking intent, the attribute tracking intent being the type of future use intent.

In some aspects, the techniques described herein relate to a method, wherein analyzing the content item includes: determining that a main object of the content item is text-based; and responsive to determining that the main object of the content item is text-based, determining that the content item is associated with a read later intent, the read later intent being the type of future use intent.

In some aspects, the techniques described herein relate to a method, further including: receiving a selection of the intent control; saving the resource identifier of the content item as a saved resource; and associating the saved resource with the tag, wherein saved resources with the type of future use intent appear on an intent tracker of the browser application.

In some aspects, the techniques described herein relate to a method, wherein the browser application has a saved resource user interface, and the method further includes: providing, as part of the saved resource user interface, a control for selecting the intent tracker for the type of future use intent.

In some aspects, the techniques described herein relate to a method, further including: adding an expiration data element to the saved resource, the expiration data element being used to remove the content item from the intent tracker programmatically.

In some aspects, the techniques described herein relate to a method, further including: displaying a list of saved resources in response to selection of a utility menu option, wherein the list of saved resources excludes saved resources with the tag; and displaying the intent tracker in response to selection of an intent tracker control, wherein the intent tracker lists saved resources with the tag.

In some aspects, the techniques described herein relate to a method, wherein the intent tracker control is an option in a saved resource user interface.

In some aspects, the techniques described herein relate to a computing system including: a processor; a display; and memory storing instructions that, when executed by the processor, cause a browser application running on the computing system to perform operations including: displaying a list of saved resources, the list of saved resources including a first selectable control and a second selectable control, in response to receiving selection of the first selectable control, displaying a list of saved resources associated with a first future use intent tag, and in response to receiving selection of the second selectable control, displaying a list of saved resources associated with a second future use intent tag.

In some aspects, the techniques described herein relate to a computing system, wherein the first future use intent tag relates to an attribute tracking intent and the saved resources associated with the first future use intent tag have respective associated attribute values and the operations further include: determining, for a first saved resource of the saved resources associated with the first future use intent tag, that an associated value has changed, the associated value being for a numerical attribute of an entity related to the first saved resource; and in response to determining that the associated value has changed, including an indication of the change with the first saved resource in the list of saved resources.

In some aspects, the techniques described herein relate to a computing system, wherein the second future use intent tag relates to a reminder intent and the saved resources associated with the second future use intent tag have respective associated reminder time attributes and the operations further include: determining that a current time is after a respective associated time attribute of a first saved resource of the saved resources associated with the second future use intent tag; and in response to determining that the current time is after a respective associated reminder time, pushing a notification to the display, the notification including a resource identifier of a content item associated with the first saved resource and text extracted from the content item.

In some aspects, the techniques described herein relate to a computing system, wherein the second future use intent tag relates to a reminder intent and the saved resources associated with the second future use intent tag have respective associated reminder time attributes and the operations further include: determining that a current time is after a respective associated time attribute of a first saved resource of the saved resources associated with the second future use intent tag; and in response to determining that the current time is after a respective associated reminder time, pushing a notification to the display, the notification including a resource identifier of a content item associated with the first saved resource and text extracted from the content item.

In some aspects, the techniques described herein relate to a computing system including: a processor formed in a substrate; a datastore of saved resources, each saved resource entry in the datastore including at least a title and a resource identifier for the saved resource; and memory storing instructions that, when executed by the processor, cause the computing system to provide a browser user interface configured to: receive an instruction to add a saved resource to the datastore, the saved resource corresponding to a content item; responsive to receiving the instruction, provide a confirmation interface configured to: confirm a title for the saved resource, and provide a control for associating a future use intent tag with the saved resource in the datastore; receive a selection of the control and, in response, associating the future use intent tag with the saved resource in the datastore; provide a first list of saved resources, the first list excluding saved resources associated with the future use intent tag; and provide a second list of saved resources, the second list excluding saved resources not associated with the future use intent tag.

In some aspects, the techniques described herein relate to a computing system, wherein the future use intent tag is a first future use intent tag and the confirmation interface is further configured to provide a second control for adding a second future use intent tag to the saved resource in the datastore, and wherein the first list of saved resources excludes saved resources associated with the first future use intent tag and excludes saved resources associated with the second future use intent tag.

In some aspects, the techniques described herein relate to a computing system, the browser user interface further being configured to provide a third list of saved resources, the third list excluding saved resources not associated with the second future use intent tag.

In some aspects, the techniques described herein relate to a computing system, wherein the confirmation interface is configured to provide the second control in response to determining that the content item relates to an entity with a numerical attribute.

In some aspects, the techniques described herein relate to a computing system, wherein the confirmation interface is configured to provide the second control in response to determining that the content item includes a future time or relates to an entity accepting reservations.

In some aspects, the techniques described herein relate to a computing system, wherein the future use intent tag is selected from a reminder intent tag, a tracking intent tag, and a tag for a default intent.

In some aspects, the techniques described herein relate to a computing system, wherein the confirmation interface is configured to select the tracking intent tag in response to determining that the content item relates to an entity with a numerical attribute.

In some aspects, the techniques described herein relate to a computing system, wherein the confirmation interface is configured to select the reminder intent tag in response to determining that the content item includes a future time.

In some aspects, the techniques described herein relate to a method comprising: receiving an instruction to add a saved resource to a datastore of saved resources, a saved resource entry in the datastore including at least a title and a resource identifier for the saved resource, the saved resource corresponding to a content item; responsive to receiving the instruction, providing a confirmation interface configured to confirm a title for the saved resource and provide a control for associating a future use intent tag with the saved resource in the datastore; receiving a selection of the control and, in response, associating the future use intent tag with the saved resource in the datastore; providing a first list of saved resources, the first list excluding saved resources associated with the future use intent tag; and providing a second list of saved resources, the second list excluding saved resources not associated with the future use intent tag.

In some aspects, the techniques described herein relate to a method, wherein the future use intent tag is a first future use intent tag and the confirmation interface is further configured to provide a second control for adding a second future use intent tag to the saved resource in the datastore, and wherein the first list of saved resources excludes saved resources associated with the first future use intent tag and excludes saved resources associated with the second future use intent tag.

In some aspects, the techniques described herein relate to a method, further including providing a third list of saved resources, the third list excluding saved resources not associated with the second future use intent tag.

In some aspects, the techniques described herein relate to a method, wherein the confirmation interface is configured to provide the second control in response to determining that the content item relates to an entity with a numerical attribute.

In some aspects, the techniques described herein relate to a method, wherein the confirmation interface is configured to provide the second control in response to determining that the content item includes a future time or relates to an entity accepting reservations.

In some aspects, the techniques described herein relate to a method, wherein the future use intent tag is selected from a reminder intent tag, a tracking intent tag, and a tag for a default intent.

In some aspects, the techniques described herein relate to a method, wherein the confirmation interface is configured to select the tracking intent tag in response to determining that the content item relates to an entity with a numerical attribute.

In some aspects, the techniques described herein relate to a method, wherein the confirmation interface is configured to select the reminder intent tag in response to determining that the content item includes a future time.

In some aspects, the techniques described herein relate to a method including: receiving an instruction to add a saved resource to a datastore of saved resources, a saved resource entry in the datastore including at least a title and a resource identifier for the saved resource, the saved resource corresponding to a content item; responsive to receiving the instruction, providing a confirmation interface configured to confirm a title for the saved resource and provide a control for associating a future use intent tag with the saved resource in the datastore; receiving a selection of the control and, in response, associating the future use intent tag with the saved resource in the datastore; and providing a list of saved resources, the list including an indication of the future use intent tag for the saved resource in the list of saved resources.

In some aspects, the techniques described herein relate to a method, further comprising providing a selectable control configured to, in response to selection, filter the list of saved resources based on the future use intent tag; receiving a selection of the control; and in response to receiving the selection, filtering the list to display saved resources associated with the future use intent tag.

In some aspects, the techniques described herein relate to a method, wherein the future use intent tag is a first future use intent tag and the confirmation interface is further configured to provide a second control for adding a second future use intent tag to the saved resource in the datastore, and the method further includes receiving a selection of the second control and associating the second future use intent tag with the saved resource in the datastore, wherein the list of saved resources includes an indication of the second future use intent tag for the saved resource.

In some aspects, the techniques described herein relate to a method, wherein the confirmation interface is configured to provide the second control in response to determining that the content item relates to an entity with a numerical attribute.

In some aspects, the techniques described herein relate to a method, wherein the second control is provided in response to determining that the content item includes a future time or relates to an entity accepting reservations.

In some aspects, the techniques described herein relate to a method, wherein the future use intent tag is selected from a reminder intent tag, a tracking intent tag, and a tag for a default intent.

In some aspects, the techniques described herein relate to a method, wherein the tracking intent tag is selected in response to determining that the content item relates to an entity with a numerical attribute.

In some aspects, the techniques described herein relate to a method, wherein the reminder intent tag is selected n response to determining that the content item includes a future time.

In one aspect, a computing device can be configured with at least one processor and memory storing instructions that, when executed by the at least one processor, performs any of the methods or operations disclosed herein.

In one aspect, a non-transitory computer-readable medium stores instructions that, when executed by a processor on a receiving computing device, causes the receiving computing device to perform any of the methods disclosed herein.

What is claimed is:

1. A non-transitory computer-readable medium storing instructions that, when executed by a processor, cause a computing device to perform operations including:
   analyzing formatting and content of a content item displayed in a browser application;
   selecting a type of future use intent, from a plurality of types of future use intent supported by the browser application, that is applicable to the content item based on the formatting and the content; and
   in response to selecting the type of future use intent that is applicable to the content item, providing an intent control configured to, in response to selection, add a resource identifier of the content item to a saved resources datastore with a tag that represents the type of future use intent.

2. The non-transitory computer-readable medium of claim 1, the operations further comprising:
receiving a selection of a saved resource control;
wherein selecting the type of future use intent is performed responsive to receiving the selection of the saved resource control.

3. The non-transitory computer-readable medium of claim 2, wherein the intent control for adding the resource identifier to the saved resources datastore is included with a saved resource confirmation window.

4. The non-transitory computer-readable medium of claim 1, wherein selecting the type of future use intent that is applicable is based on analysis of the content item by an intent detection model configured to recognize the formatting and the content in the content item for the type of future use intent.

5. The non-transitory computer-readable medium of claim 1, wherein providing the intent control includes adding a selectable icon to an address input area of the browser application.

6. The non-transitory computer-readable medium of claim 5, wherein providing the intent control further includes adding the selectable icon with a saved resource control in the address input area.

7. The non-transitory computer-readable medium of claim 1, wherein providing the intent control further includes adding a drop-down control to a saved resource control in an address input area, the drop-down control being selectable and, in response to being selected, provides access to the intent control.

8. The non-transitory computer-readable medium of claim 1, the operations further comprising:
receiving a selection of the intent control;
saving the resource identifier of the content item as a saved resource; and
associating the saved resource with the tag.

9. The non-transitory computer-readable medium of claim 8, the operations further comprising:
displaying a list of saved resources in a saved resource user interface, the list of saved resources including the saved resource for the resource identifier,
wherein the saved resource for the resource identifier includes an indication of the tag.

10. The non-transitory computer-readable medium of claim 8, the operations further comprising:
adding an expiration data element to the saved resource, the expiration data element being used to remove the content item from the saved resources datastore programmatically.

11. The non-transitory computer-readable medium of claim 1, the operations further comprising:
displaying a list of saved resources in response to selection of a utility menu option, wherein the list of saved resources excludes saved resources with the tag; and
displaying an intent tracker in response to selection of an intent tracker control, wherein the intent tracker lists saved resources with the tag.

12. The non-transitory computer-readable medium of claim 11, wherein the intent tracker control is an option in a saved resource user interface.

13. A computing system comprising:
a processor formed in a substrate;
a datastore of saved resources, a saved resource in the datastore including at least a title and a resource identifier for the saved resource; and
memory storing instructions that, when executed by the processor, cause the computing system to perform operations including:
analyzing formatting and content of a content item displayed in a browser application;
selecting a type of future use intent, from a plurality of types of future use intent supported by the browser application, that is applicable to the content item based on the formatting and the content; and
in response to selecting the type of future use intent that is applicable to the content item, providing an intent control configured to, in response to selection, add a resource identifier of the content item to the datastore of saved resources with a tag that represents the type of future use intent.

14. The computing system of claim 13, the operations further including:
receiving a selection of a saved resource control;
wherein selecting the type of future use intent is performed responsive to receiving the selection of the saved resource control.

15. The computing system of claim 13, wherein selecting the type of future use intent that is applicable is based on analysis of the content item by an intent detection model configured to recognize the formatting and the content in the content item for the type of future use intent.

16. The computing system of claim 13, the operations further including:
receiving a selection of the intent control;
saving the resource identifier of the content item as a saved resource; and
associating the saved resource with the tag.

17. The computing system of claim 16, the operations further including:
displaying a list of saved resources in a saved resource user interface, the list of saved resources including the saved resource for the resource identifier,
wherein the saved resource for the resource identifier includes an indication of the tag.

18. A method comprising:
analyzing formatting and content of a content item displayed in a browser application;
selecting a type of future use intent, from a plurality of types of future use intent supported by the browser application, that is applicable to the content item based on the formatting and the content; and
in response to selecting the type of future use intent that is applicable to the content item, providing an intent control configured to, in response to selection, add a resource identifier of the content item to a saved resources datastore with a tag that represents the type of future use intent.

19. The method of claim 18, wherein analyzing the formatting includes comparing the formatting to expected formatting associated with the plurality of types of future use intent.

20. The method of claim 18, wherein the content is associated with a numerical attribute that can change over time,
and the selected type of future use intent is an attribute tracking intent type.

21. The method of claim 18, wherein the content is associated with a future time, and
the selected type of future use intent is a reminder intent type having a time attribute.

22. The method of claim 21, further comprising:
receiving a selection of the intent control and a provided future time;
saving the resource identifier of the content item and the provided future time as a saved resource; and
associating the saved resource with the tag.

\* \* \* \* \*